(12) United States Patent
Katsumata

(10) Patent No.: US 9,431,946 B2
(45) Date of Patent: Aug. 30, 2016

(54) MOTOR CONTROL DEVICE AND MOTOR CONTROL METHOD

(71) Applicant: Nissan Motor Co., Ltd., Yokohama-shi, Kanagawa (JP)

(72) Inventor: Yuji Katsumata, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/761,815

(22) PCT Filed: Feb. 6, 2014

(86) PCT No.: PCT/JP2014/052737
§ 371 (c)(1),
(2) Date: Jul. 17, 2015

(87) PCT Pub. No.: WO2014/132766
PCT Pub. Date: Sep. 4, 2014

(65) Prior Publication Data
US 2015/0365032 A1 Dec. 17, 2015

(30) Foreign Application Priority Data

Feb. 26, 2013 (JP) ................................ 2013-035637

(51) Int. Cl.
*H02P 27/04* (2016.01)
*H02P 21/14* (2016.01)
(Continued)

(52) U.S. Cl.
CPC .......... *H02P 21/141* (2013.01); *B60L 3/0061* (2013.01); *B60L 3/06* (2013.01); *B60L 15/025* (2013.01); *B60L 15/2072* (2013.01); *H02P 6/28* (2016.02); *H02P 21/22* (2016.02); *B60L 2220/12* (2013.01); *B60L 2240/421* (2013.01);
(Continued)

(58) Field of Classification Search
CPC ......... H02P 21/141; H02P 6/28; H02P 21/22
USPC ....................................................... 318/802
See application file for complete search history.

(56) References Cited

U.S. PATENT DOCUMENTS 7,282,886 B1  10/2007 Patel et al.
2004/0001291 A1  1/2004 Boeffel
(Continued)

FOREIGN PATENT DOCUMENTS

CN  101299590 A  11/2008
CN  101362428 A  2/2009
(Continued)

*Primary Examiner* — Erick Glass
(74) *Attorney, Agent, or Firm* — Global IP Counselors, LLP

(57) ABSTRACT

A motor control device includes a current command value calculating device calculating a basic current command value, a first compensation device compensating for a delay in the rotor magnetic flux response of the motor by amplifying the basic current command value, a first current command value limiting device for restricting a post-compensation current command value by a first current limiting value, a second compensation device calculating a compensation value for the amplified current command value, an adding device calculating the post-compensation current command value by adding the amplified current command value and the compensation value, and motor control device controlling the motor, the second compensation device calculating, as the compensation value, a command value corresponding to a portion limited by the first current limiting value of the amplified current amplification command value.

20 Claims, 15 Drawing Sheets

(51) Int. Cl.
*B60L 15/02* (2006.01)
*B60L 3/00* (2006.01)
*B60L 3/06* (2006.01)
*B60L 15/20* (2006.01)

(52) U.S. Cl.
CPC ..... *B60L2240/423* (2013.01); *B60L 2240/427* (2013.01); *B60L 2240/429* (2013.01); *Y02T 10/643* (2013.01); *Y02T 10/72* (2013.01); *Y02T 10/7275* (2013.01)

(56) References Cited

U.S. PATENT DOCUMENTS

| | | | | |
|---|---|---|---|---|
| 2007/0296364 | A1* | 12/2007 | Shoemaker | G05B 13/042 318/561 |
| 2008/0186000 | A1* | 8/2008 | Kimura | B60L 15/025 322/23 |
| 2008/0224649 | A1 | 9/2008 | Bae et al. | |
| 2013/0088179 | A1* | 4/2013 | Kobayashi | H02P 21/141 318/400.02 |

FOREIGN PATENT DOCUMENTS

| | | |
|---|---|---|
| CN | 102487263 A | 6/2012 |
| CN | 102868339 A | 1/2013 |
| EP | 2023478 A2 | 2/2009 |
| EP | 2544360 A2 | 1/2013 |
| JP | 8-142886 A | 6/1996 |
| JP | 8-163900 A | 6/1996 |
| JP | 11-308900 A | 11/1999 |
| JP | 2001-45613 A | 2/2001 |
| JP | 2003-9559 A | 1/2003 |
| JP | 3531250 B2 | 3/2004 |
| JP | 3679246 B2 | 5/2005 |
| JP | 2009-44871 A | 2/2009 |
| JP | 2009-220665 A | 10/2009 |
| JP | 2012-120412 A | 6/2012 |

\* cited by examiner

MOTOR CONTROL DEVICE AND MOTOR CONTROL METHOD

CROSS-REFERENCE TO RELATED APPLICATIONS

This application is a U.S. National stage application of International Application No. PCT/JP2014/052737, filed Feb. 6, 2014, which claims priority to Japanese No. 2013-035637 filed in Japan on Feb. 26, 2013, the contents of each of which is hereby incorporated herein by reference.

BACKGROUND

1. Field of the Invention

The present invention relates to a motor control device and a motor control method.

2. Background Information

A motor control system is disclosed in JP H8-163900 A, which includes an excitation current command value calculating unit for calculating an excitation current command value for generating a target magnetic flux in an induction motor control device and an excitation current limiter unit for limiting the positive and negative excitation current command limit values, wherein the excitation current command value calculating unit calculates the excitation current command value so as to significantly change the value of the excitation current in order to change the response of a secondary magnetic flux. In addition, the excitation current limiter sets the limit values to prevent excessive current from being supplied in order to protect the driving circuit of an inverter (JP H8-163900 A).

SUMMARY

However, in the above motor control device, in order to increase the responsiveness of the magnetic flux, in response to applying a transiently large excitation current, when the exciting current has been limited by an upper limit value representing a constant maximum allowable current, the amount of the excitation current which has been subject to restriction or limit would not flow. Thus, a problem arises and torque responsiveness deteriorates due to insufficient rotor flux.

An object of the present invention intends to solve is to provide a motor control device or a motor control method to improve the response of the torque.

The problem described above is solved, according to the present invention, by amplifying a base current command value based on a torque command value to compensate for the delay of the rotor flux response of the motor, by limiting or restricting a post-compensation command value by a first current limit value, by calculating a compensation value for the amplified current command value based on the amplified current command value and the first restricted current command value, and by adding the amplified current command value and the compensation value to calculate the post-compensation command value. In addition, by calculating a portion or amount of the amplified current command value which has been subject to restriction by the first current limit value as the compensation value, the object described above will be solved.

According to the present invention, when the amplified current command value for compensating for delay in the rotor flux response has been subject to a current limit value, by adding the restricted portion of the current command value to the amplified current command value as the compensation value, after the amplified current command value reaches a value which is not subject to restriction by the current limit value, the amplified current command value is compensated for by the compensation value so that it is possible to improve the responsiveness of the torque.

BRIEF DESCRIPTION OF THE DRAWINGS

Referring now to the attached drawings which form a part of this original disclosure.

DETAILED DESCRIPTION OF THE EMBODIMENTS

Hereinafter, a description is given of embodiments according to the present invention with reference to the drawings.

First Embodiment

Figure 1:
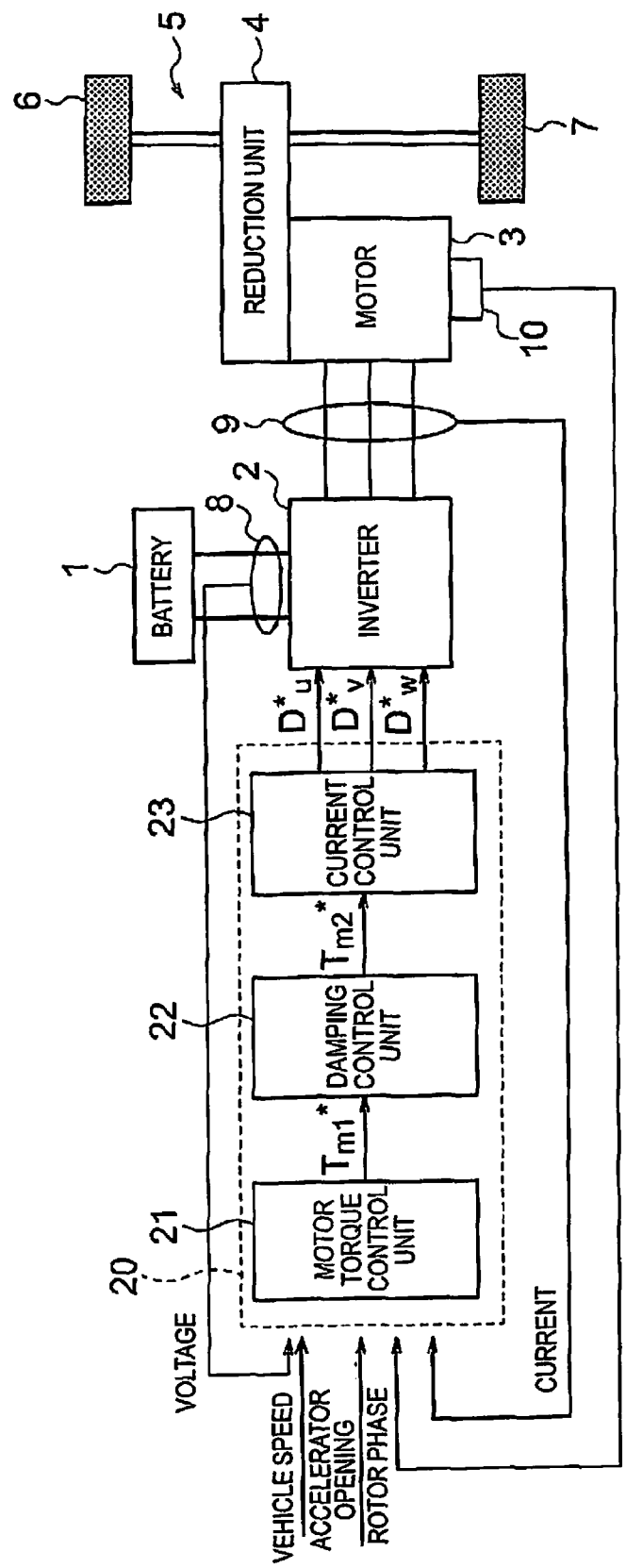
FIG. 1 is a block diagram of an electric vehicle system of an embodiment according to the present invention.

FIG. 1 is a block diagram showing the configuration of an electric vehicle system equipped with a motor control device pertaining to an embodiment according to the present invention. Below, although description is given by referring to an example in which the motor control device according to the present embodiment is applied to the electric vehicle, the present motor control device is equally applicable to other vehicles than the electric vehicle such as a hybrid electric vehicle (HEV).

As shown in FIG. 1, a vehicle which includes a motor control device of this embodiment includes a battery 1, an inverter 2, a motor 3, a speed reduction unit 4, a drive shaft (driving shaft) 5, driving wheels 6, 7, a voltage sensor 8, a current sensor 9, a rotation sensor 10, and a motor controller 20.

The battery 1 represents a power source of the vehicle and is formed by connecting a plurality of secondary batteries in series or parallel. An inverter 2 includes a power conversion circuit in which a plurality of switching elements, such as IGBT or MOSFET, is provided, such that two of these are connected for each phase. The inverter 2, by switching ON and OFF the switching elements in response to a drive signal from the motor controller 20, converts the DC power outputted from the battery 1 into AC power for outputting to the motor 3. Thus, the motor 3 is driven by flow of a desired current. Also, the inverter 2 inversely converts the AC power output by regeneration of the motor 3 for outputting to the battery 1.

The motor 3 represents a drive source of the vehicle and is configured in an induction motor for transmitting a driving force to driving wheels 6, 7 via a reduction unit 4 and the drive shaft 5. The motor 3 rotates jointly with the driving wheels 6 and 7, and, by generating a regenerative driving force, recovers the kinetic energy of the vehicle as electrical energy. Thus, the battery 1 is discharged by the driving operation of the motor 3, while being charged by the regenerative operation of the motor 3.

The voltage sensor 8 is a sensor for detecting the voltage of the battery 1, and is connected between the battery 1 and the inverter 2. The detection voltage of the voltage sensor 8 is output to the motor controller 20. The current sensor 9 is a sensor for detecting the current of the motor 3, and is connected between the inverter 2 and the motor 3. The detection current of the current sensor 9 is output to the motor controller 20. The rotation sensor 10 is a sensor for detecting the rotation speed of the motor 3, and is constituted by a resolver or the like. The detection value of the rotation sensor 10 is output to the motor controller 20.

The motor controller 20, based on a vehicle speed (V), an accelerator opening (APO), a rotor phase of the motor 3 ($\theta_{re}$), a motor current, a voltage of the battery 1, and the like, generates a PWM signal for operating the inverter 2 to output to a drive circuit (not shown) for the inverter operation. The drive circuit, based on the PWM control signal, controls a drive signal of a switching element of the inverter 2 for outputting to the inverter 2. Thus, the motor controller 20 drives the motor 3 by operating the inverter.

The motor controller 20 is a controller for controlling the motor 3. The motor controller 20 includes a motor torque control unit 21, a damping control unit 22, and a current control unit 23.

The Motor torque control unit 21, based on a signal of the vehicle information indicating the vehicle variables to be inputted to the motor controller 20, calculates a torque command value ($T_{m1}^*$) corresponding to a required torque in response to a user operation or a system requirement for outputting to the damping control unit 22.

Figure 2:
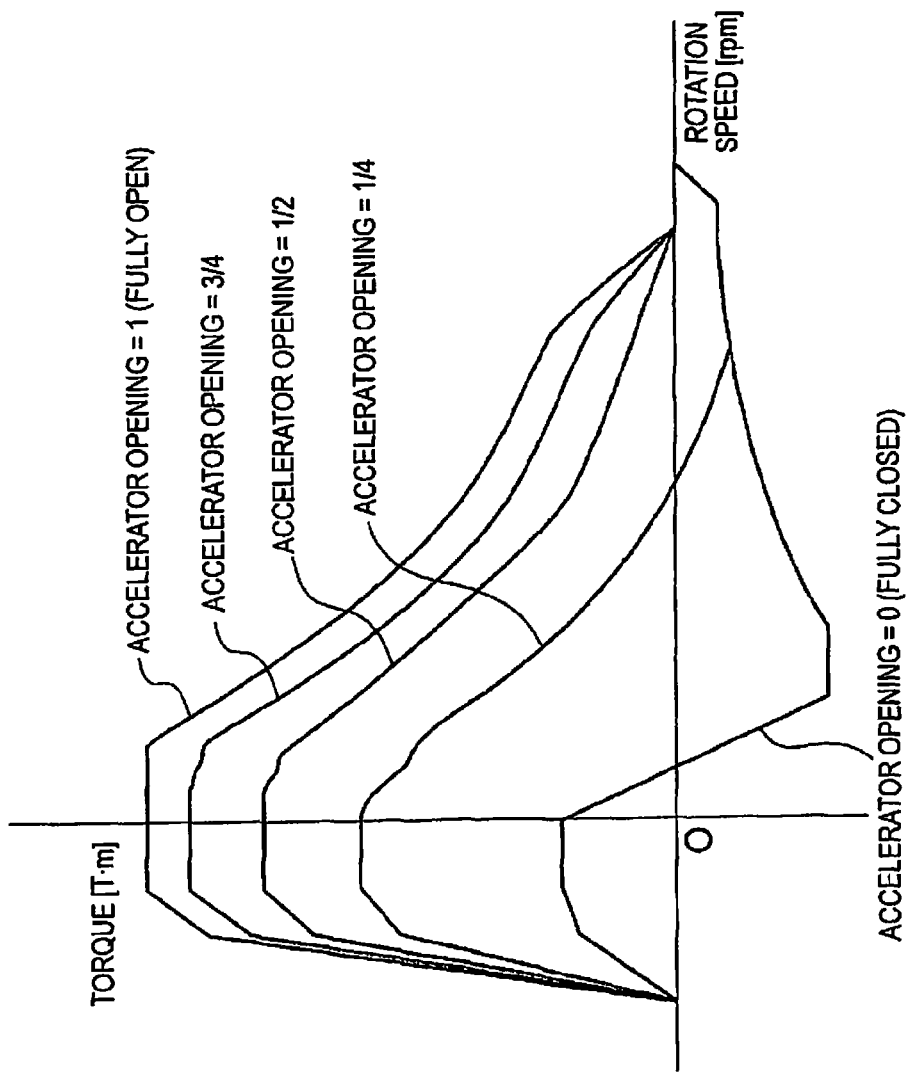
FIG. 2 is a graph for illustrating a map referred to by a motor torque control unit in FIG. 1, which shows a correlation of a motor rotation speed and a torque command value for each accelerator opening.

In the motor torque control unit 21, a torque map showing the relationship of FIG. 2 is stored in advance. FIG. 2 is a graph showing the correlation of the motor rotation speed and the basic target torque command value in each accelerator opening. The torque map is previously set as the relationship of the torque command value with respect to accelerator opening for each accelerator opening. The torque map is set with the torque command value such that, with respect to the accelerator opening and the motor rotation speed, torque may be output efficiently from the motor 3.

The motor rotation speed is calculated based on the detection value of the rotation sensor 10. The accelerator opening is detected by an accelerator opening sensor (not shown). The motor torque control unit 21 refers to the torque map, and calculates a base target torque command value ($T_{m1}^*$) corresponding to the input accelerator opening (APO) and the motor rotation speed for outputting to the damping control unit 22. When a shift lever is set to a parking position or the neutral position, the base target torque command value ($T_m^*$) becomes zero.

Note that the base target torque command value ($T_{m1}^*$) is not necessarily calculated by the accelerator opening and the motor speed only. A vehicle speed and the like may be added for calculation, for example. The vehicle speed V [km/h] may be obtained in the communication with a meter, a brake controller, or the like. Alternatively, the vehicle speed may be obtained by first multiplying a tire dynamic radius (R) to a rotor mechanical angular velocity ($\omega$ rm), and the dividing by a gear ratio of the final gear to obtains a vehicle speed v [m/s], and further multiplying a unit conversion coefficient (3600/1000) for conversion from the unit [m/s] to the unit [km/h].

The damping control unit 22 receives the basic motor torque command value $T_{m1}^*$ and the motor rotation speed $N_m$ as input, and, without sacrificing the response of the drive shaft torque, calculates a post-damping torque command value $T_{m2}^*$ which suppresses the vibration of the power transmission system torque caused by torsional vibration of the drive shaft 5 (driving shaft). Fore detailed control of the damping control unit 22, for example, see Japanese Patent Application Publications (JP No. 2001-45613A and JP No. 2003-9559 A). Further, the damping control unit 22 output the post-damping torque command value $T_{m2}$ to the current control unit 23. Note that the damping control unit 22 is not necessarily required.

Figure 3:
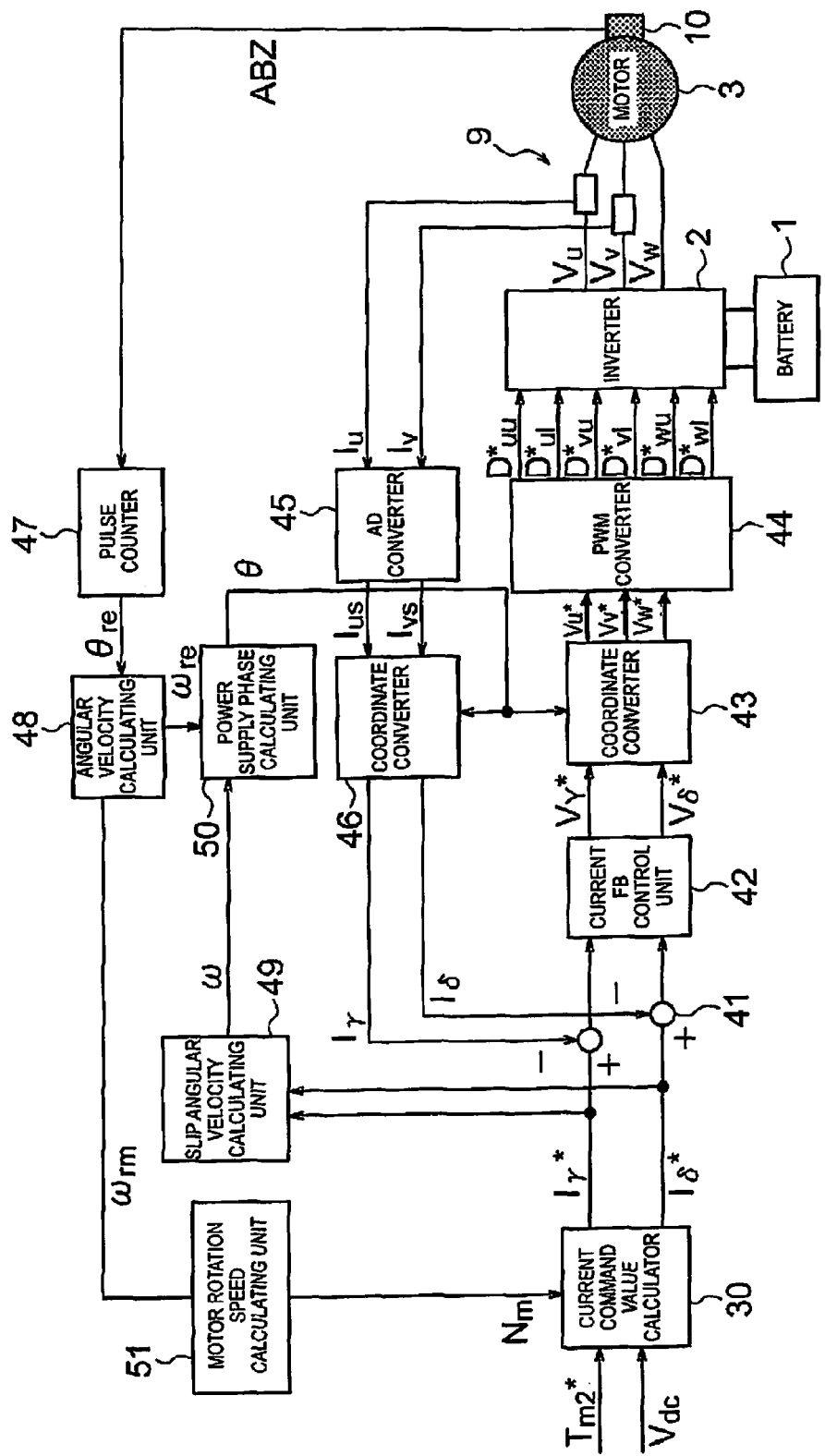
FIG. 3 is a block diagram of the current control unit in FIG. 1.

Returning back to FIG. 1, the current control unit 23 represents a control unit that controls a current flowing through the motor 3 based on the torque command value ($T_{m2}^*$). Below, with reference to FIG. 3, a description is given of a configuration of the current control unit 23. FIG. 3 is a block diagram of the current control unit 23, the battery 1, and the like.

The current control unit 23 includes a current command value calculating unit (or device) 30, a subtracting unit 41, a current FB control unit 42, a coordinate system converter 43, a PWM converter 44, an AD converter 45, a coordinate system converter 46, a pulse counter 47, an angular velocity calculating unit 48, a slip angle velocity calculating unit 49, a power source phase calculating unit 50, and a motor rotation speed calculating unit 51.

The current command value calculator 30 receives a post-damping torque command value (T m2*) input from the damping control unit 22, the rotation speed (Nm) input from the motor rotation speed calculating unit 51, and the detection voltage (Vdc) of the voltage sensor 8 for calculating and outputting $\gamma\delta$-axis current command values (I $\gamma^*$, I $\delta^*$). Here, the $\gamma\delta$-axes show the components of the rotating coordinate system.

The subtracting unit 41 calculates differences between the $\gamma\delta$-axis current command values (I $\gamma^*$, I $\delta^*$) and the $\gamma\delta$-axis current (*I $\gamma$, I $\delta^*$) to output to the current FB control unit 42. The current FB control unit 42 performs a feedback control such that the $\gamma$-axis current (I $\gamma$) and the $\delta$-axis current (I δ) respectively match the γ-axis command value (I γ*) and δ-axis command value (I δ*). The current FB controller 42 controls and calculates such that the γδ-axis current (I γ, I δ) follows the γδ-axis current command values at a predetermined response without steady deviation or difference, and outputs the voltage command values of the γδ axes (v γ*, v δ*) to the coordinate converter 43. Note that the γ-axis current represents an excitation current of the motor 3, while the δ axis current represents a torque current of the motor 3. Moreover, the non-interference control may be added to control the subtracting unit 41 and the current FB control unit 42.

The coordinate converter 43 receives the γδ-axis voltage command values (v γ*, v δ*) and the power supply phase (θ) calculated by the power source phase calculating unit 50, and converts the γδ-axis voltage command values (v γ*, v δ*) to u, v, w-axis voltage command values in a fixed coordinate system (v u*, v v*, vw*) for outputting to the PWM converter 44.

The PWM converter 44, based on the input voltage command values (V u*, V v*, V w*), generates switching signals of the switching elements of the inverter 2 (D*uu, D*ul, D*vu, D*vl, D*wu, D*wl) for outputting to the inverter 2.

The A/D converter 45 samples the phase current (I u, I v) indicating detection values of the current sensor 9, and outputs the sampled phase current (I us, I vs) to the coordinate converter 46. Since the sum of the current values of the three phases is zero, the w-phase current is not detected by the current sensor 9. Alternatively, the coordinate converter 46 calculates the phase current of the w phase (I ws) based on the input phase current (I us, I vs). Note that, with respect to the w phase current, a current sensor 9 may be disposed in the w phase for current detection.

The coordinate converter 46 is intended for performing a three-phase to two-phase conversion, and, using a supply power phase (θ), converts the phase current of the fixed coordinate system (I us, I vs, I ws) to γδ axis current of the rotating coordinate system (I γs, I δs) for outputting to the subtracting unit 41. Thus, the current value detected by the current sensor 9 is fed back.

The pulse counter 47, by counting the pulses output from the rotation sensor 10 to obtain a rotor phase (θ re) (electrical angle) indicating position information of the motor 3 for outputting to the angular velocity calculating unit 48.

The angular velocity calculating unit 48 performs a differential operation of the rotor phase (θ re) to calculate the rotor angular velocity (ω re) (electrical angle) for outputting to the power supply phase calculating unit 50. Further, the angular velocity calculating unit 48, by dividing the calculated rotor angular velocity (ω re) by the number of pole pairs p of the motor 3 to calculate a rotary mechanical angular velocity of the motor (ω rm) [rad/s] for outputting to the motor rotation speed calculating unit 51.

The slip angular velocity calculating unit 49 calculates a rotor flux estimation value (φ Est) considering a rotor flux response delay with respect to the excitation current command value
(I γ*) by the following equation (1):

$$\phi_{est} = \frac{M}{\tau_\phi s + 1} I_\gamma^* \qquad (1)$$

Wherein, M indicates the mutual inductance, and τ φ is the response time constant of the rotor flux. In addition, τ φ is represented by Or/Rr, wherein Or is the self-inductance of the rotor, and Rr indicates the rotor resistance.

Further, the slip angular velocity calculating unit 49, as represented by the equation (2), calculates a slip angular velocity (ω se) by dividing the ratio of the torque current command value (I δ*) to the rotor flux estimate (φ Est) obtained from equation (1), by a constant determined by the characteristics of the motor.

$$\omega_{se} = \frac{M \cdot R_r}{L_r} \cdot \frac{I_\delta^*}{\phi_{est}} \qquad (2)$$

Note that these values, M, τ φ, M·Rr/Lr and the like may be used by calculating or experimentally obtaining for storing in a table in advance with respect a rotor temperature, a current value, and the torque command value.

Further, the slip angular velocity calculating unit 49 outputs to the power supply phase calculating unit 50 the slip angular velocity (ω se). Thus, by setting the slip angular velocity (ω se), the output torque will be handled by the product of the torque current and the rotor flux.

Further, the power supply phase calculating unit 50, as shown in the following equation (3) below, by adding the slop angular velocity (ω se) to the rotor angular velocity (ω re) (electrical angle) and integrating the sum to calculate a power supply phase (θ) for outputting to the coordinate converters 43, 46.

$$\theta = \frac{1}{s}(\omega_{re} + \omega_{se}) \qquad (3)$$

The motor rotation speed calculating unit 51 calculates a motor rotation speed (Nm) by multiplying the coefficient (60/2π) for the unit conversion from [rad/s] to [rpm] with the rotor mechanical angular velocity (ω rm) for outputting to the current command value calculating unit 30.

Figure 4:
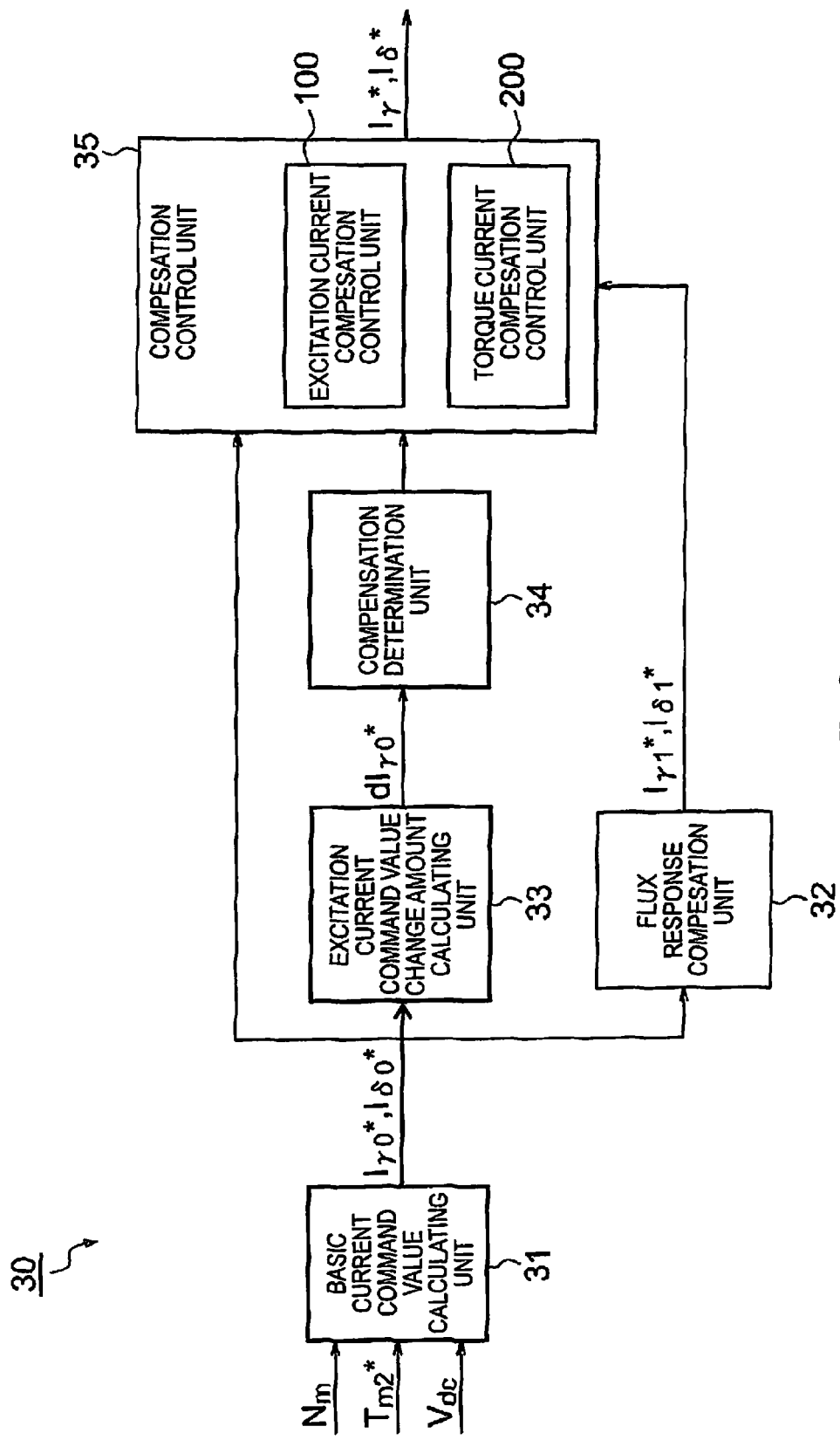
FIG. 4 is a block diagram of a current command value calculating unit in FIG. 3.

Now, a description of the configuration of the current command value calculating unit 30 is given with reference to FIG. 4. FIG. 4 is a block diagram showing the configuration of a current command value calculating unit 30. The current command value calculating unit 30 includes a base current command value calculating unit 31, a magnetic flux response compensation unit 32, an excitation current command value change amount calculating unit 33, a compensation determining unit 34, and a compensation control unit 35.

In the base current command value calculating unit 31, a map is stored in advance showing a relationship between basic γδ-axis current command values (I γ0*δ0*) with respect to a post-damping control torque command value (T m2*), the voltage of the battery 1 (V dc) and the motor speed (N m). The basic γδ-axis current command values (I γ0*, I δ0*) represent a current command value which is obtainable through experiment or calculations for optimization of the overall efficiency of the inverter 2 and the motor 3 with respect to the post-damping control torque command value (T m2*), the voltage of the battery 1 (V dc) and the motor speed (N m). Further, the basic current command value calculating unit 31 refers to the map and calculates the basic γδ-axis current command values (I γ0*, I δ0*) corresponding to the post-damping control torque command value (T m2*), the voltage of the battery 1 (V dc) and the motor speed (N m) for outputting to the magnetic flux response compensation unit 32 and the excitation current command change amount calculating unit 33.

The flux response compensation unit 32 is intended to calculate at least one current command value of the flux compensation γ-axis current value ($I_{\gamma1}^*$) and the flux compensation δ-axis current value ($I_{\delta1}^*$) to amplify the basic current command value by advancing the lag phase in order to compensate for the rotor flux delay.

In general, the response of the rotor flux is lower by one or more digits as compared to the response of the torque current. Further, the output of the motor 3 is proportional to the product of the rotor flux and torque current of the stator. Therefore, due to the response delay of the rotor flux, the torque response is delayed. The flux response compensation unit 32 compensates the current command value to compensate for the delay in such torque response. Thus, since the motor 3 may be supplied with a transiently large exciting due to increase in the base current command value, it is possible to improve torque responsiveness while improving the rotor flux response.

The flux response compensation unit 32, as indicated by the following equation (4), by multiplying the basic γ-axis current command value (I γ0*) with a coefficient containing a response time constant of the stator current (τ i) and a response time constant of the rotor flux (τ φ), calculates a flux compensation γ-axis current command value (I γ1*) for outputting to the compensation control unit 35.

$$I_{\gamma1}^* = \frac{\tau_\phi s + 1}{\tau_i s + 1} I_{\gamma0}^* \quad (4)$$

Between the response time constant of the stator current (τ i) and the response time constant of the rotor flux ($T_\phi$), the relationship of τ i<τ φ is satisfied. Therefore, the magnetic flux responsive compensation unit 32 uses equation (4) and calculates the flux compensation γ-axis current command value (I γ1*) to function as a phase advance compensator.

Also, the flux responsive compensating unit 32, when improving the response of the torque current, multiplies the base δ-axis current value (I δ0*) with a function including the response time constant of the stator current (T i) and a response time constant of the rotor flux (τφ) to calculate the magnetic flux compensation δ-axis current command value (I δ1*) for outputting to the compensation control unit 35. The arithmetic expression for the flux compensation δ-axis current value (I δ1*) is represented by the following equation (5).

$$I_{\delta1}^* = \frac{\tau_\phi s + 1}{\tau_i s + 1} I_{\delta0}^* \quad (5)$$

The excitation current command value change amount calculating unit 33 uses the approximate equation of the following formula (6), and calculates a change amount (dI γ0*) in the basic γ-axis current command value from the input basic γ-axis current value (I γ0*), for outputting to the compensation determining unit 34.

$$dI_{\gamma0}^* = \frac{s}{\tau_0 s + 1} I_{\gamma0}^* \quad (6)$$

Wherein τ 0 represents a set value indicating the length of time in which the change in the basic γ-axis current value (I γ0*) is approximately calculated, and is obtainable through design or experiments in advance, Note that the amount of change (dI γ0*) may also be obtained by calculating the difference between the basic γ axis current value of the previous calculation (I γ0*) and the basic γ axis current value at the current calculation (I γ0*). The calculating unit such as the current command value calculating unit 30 and the like included in the motor controller 20 calculate the command value and the like at a predetermined control cycle. The command value of previous calculation denotes a command value which has been calculated at an earlier timing by the predetermined control cycle than the command value of the current calculation.

The compensation determination unit 34 compares the amount of change in the basic γ axis current command value (dI γ0*) with a determination threshold value (I 0), and based on the comparison result, to determine whether to perform additional compensation for the excitation current or to perform additional compensation for the torque current.

In the present embodiment, while compensating for either the excitation current or the torque current at the flux response compensation unit 32, the compensation control unit 35 performs an additional compensation. In addition, depending on the change amount in the excitation current command value, the compensation control unit 35 selectively performs the compensation for higher torque responsiveness through the excitation current or the torque current. Therefore, the compensation determination unit 34, in order to select a compensation target at the compensation control unit 35, performs a comparison between the change amount WI γ0*) and the determination threshold value (I 0) for outputting the comparison result to the compensation control unit 35.

The determination threshold (I 0) determines whether to carry out an additional compensation on the excitation current or the torque current, and is a previously set threshold obtained either through design consideration or through experiments.

When the amount of change in the basic γ axis current command value (dI γ0*) is greater than the determination threshold (I 0), the compensation determination unit 34 determines that the excitation current changes and transmits a signal to the compensation control unit 35 requesting for allowing an additional compensation for the excitation current to enhance the response speed.

On the other hand, when the amount of change in the basic γ axis current command value (dI γ0*) is equal to the determination threshold (I 0) or less, the compensation determination unit 34 transmits a signal to the compensation control unit 35 requesting for allowing an additional compensation for torque current since the amount of change in the excitation current is small and thus it is not necessary for the response speed of the excitation current to be enhanced, The compensation control unit 35 is intended to serve a control unit that, in order to increase the response speed of the torque, based on the determination result of the compensation determination unit 34, selectively performs an additional compensation for the excitation current and an additional compensation for the torque current. The compensation control unit 35 includes an excitation current compensation control unit 100 and a torque current compensation control unit 200.

When the compensation determination unit 34 allows the additional compensation for the excitation current, the compensation control unit 35 controls the excitation current compensation control unit 100 to perform a control to increase the torque response speed. The excitation current compensation control unit 100 calculates γδ-axis current command value (I γ*, I δ*) based on the flux compensation γ-axis current command value (I γ1*) compensated by the flux response compensation unit 32, the basic δ-axis current value (I δ0*), and post-damping control torque command value (T m2*) for outputting to the subtractor 41 and the slip angular velocity calculating unit 49.

When the compensation determination unit 34 allows the additional compensation for the torque current, the compensation control unit 35 controls the torque current compensation control unit 200 to perform a control to increase the torque response speed. The torque current compensation control unit 200 calculates γδ-axis current command value (I γ*, I δ*) based on the flux compensation δ-axis current command value (I δ1*) compensated by the flux response compensation unit 32, the basic γ-axis current value (Iγ0*), and post-damping control torque command value (T m2*) for outputting to the subtractor 41 and the slip angular velocity calculating unit 49.

Figure 5:
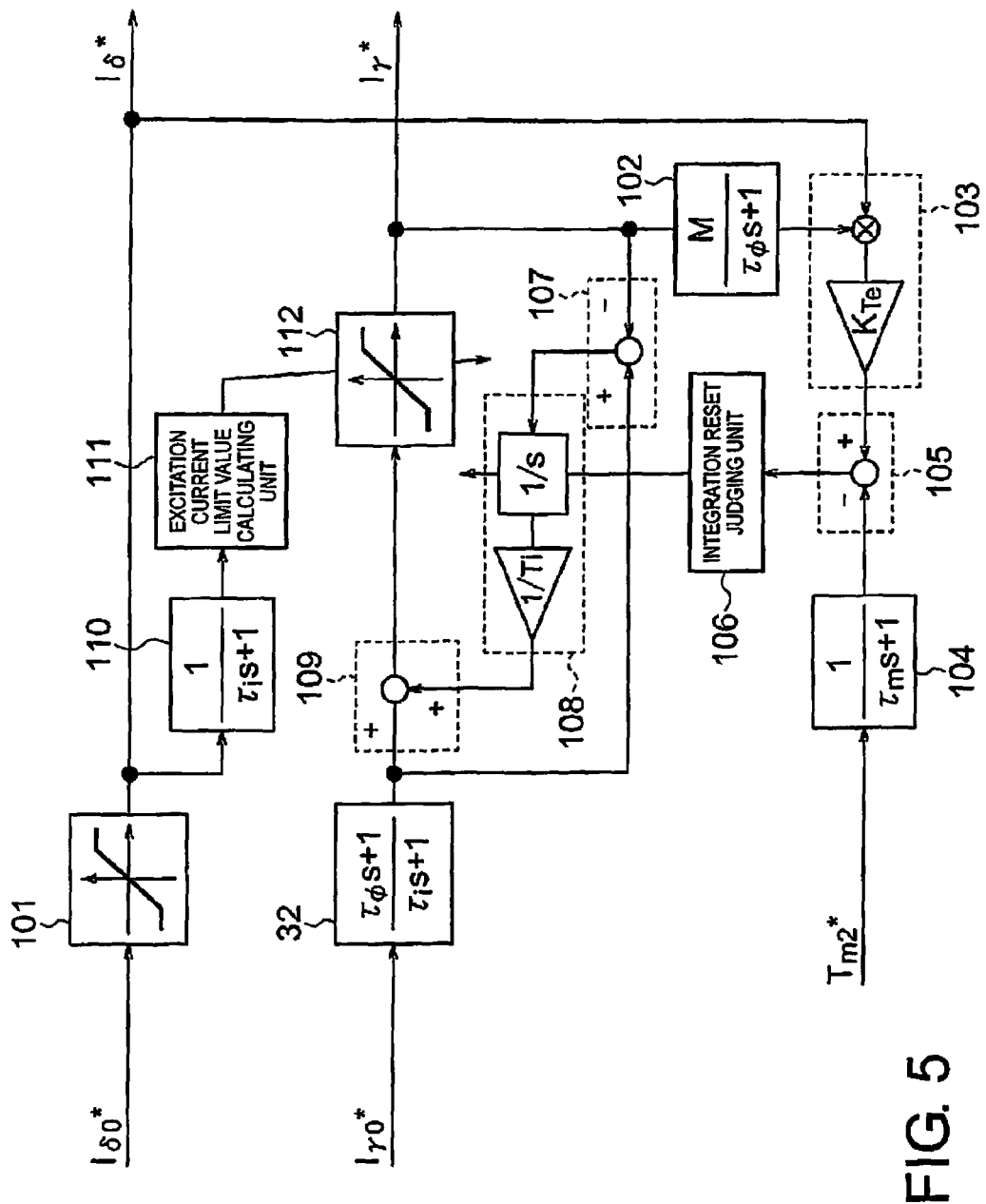
FIG. 5 is a block diagram of an excitation current compensation control unit of FIG. 4.

Now, a description of detailed configuration of the excitation current compensation control unit 100 with reference to FIG. 5. FIG. 5 is a block diagram showing the configuration of a magnetic flux response compensation unit 32 and the exciting current compensation control unit 100.

The excitation current compensation control unit 100 includes a torque current limit section 101, a rotor flux estimation unit 102, an output torque estimation unit 103, an ideal response torque calculating unit 104, a torque deviation calculating unit 105, an integration reset judging unit 106, an excitation current command value deviation calculating unit 107, an additional compensation value calculating unit 108, an adder 109, a torque current estimation unit 110, an excitation current limit value calculating unit 111 and an excitation current limiting unit 112.

The torque current limiting unit 101 calculates a δ-axis current command value (I δ) by applying a restriction of current limit (±Imax_δ) on the input basic δ-axis current command value (I δ0*). The current limit value (±Imax_δ) is defined by the upper and lower limits, and represent thresholds previously set by the design or experiments.

The torque current limiting unit 101, when the basic δ-axis current value (I δ0*) is higher than the upper limit current value of the upper limit (+Imax_δ), the current limit value (+Imax_δ) is calculated as the δ-axis current command value (I δ). The torque current limiting unit 101, when the basic δ-axis current value (I δ0*) is less than the lower limit current value (−Imax_δ), the current limit value (−Imax_δ) is calculated as the δ-axis current value (I δ*). Also, the torque current limiting unit 101, when the basic δ-axis current value (I δ0*) is higher than the lower limit current limit value (−Imax_δ) and, less than the upper limit current limit (+Imax_δ), poses no restriction by the limit value and calculates the basic δ-axis current value (I δ0*) as the δ-axis current value (I δ*).

The torque current limiting unit 101 outputs the calculated δ-axis current command value (I δ) to the output torque estimation unit 103, the torque current estimation unit 110, and the subtractor 41 and the like.

In the rotor flux estimation unit 102, as shown in equation (7), by multiplying the previous value (I γ_Z*) of the γ-axis current command value (I γ*) calculated by the excitation current limiting unit 112 with a function including the mutual inductance M and the response time constant of the rotor flux (τ φ), calculates the rotor flux estimation value (φ est_z) for outputting to the output torque estimation unit 103.

$$\phi_{est\_z} = \frac{M}{\tau_\phi s + 1} I^*_{\gamma\_z} \qquad (7)$$

The response time constant of the rotor flux (τ φ) is represented by Lr/Rr, wherein Lr represents the self-inductance of the rotor, and Rr indicates the rotor resistance. Lr, Rr are pre-set values previously set by calculation or experiment.

The output torque estimation unit 103, as indicated by the equation (8), calculates the output torque estimate (T m_est) by multiplying the rotor flux estimate (φ est_z) with the δ-axis current value (I δ), and the torque constant (K Te) for outputting to the torque deviation calculating unit 105.

$$T_{m\_est} = K_{Te} \cdot \phi_{est\_z} \cdot I^*_\delta \qquad (8)$$

The torque constant (K Te) is represented by p·M/Lr, wherein p represents the number of pole pairs, M represents a mutual inductance, and Lr indicates the self-inductance of the rotor. p, M, and Lr are pre-set values obtainable through calculation or experiment.

The ideal response torque calculating unit 104, as shown in equation (9), calculates a torque ideal response value (T m_ref) by multiplying the post-damping torque command value (T m2*) with a function including time constant (τ m) for outputting to the torque deviation calculating unit 105.

$$T_{m\_ref} = \frac{1}{\tau_m s + 1} T^*_{m2} \qquad (9)$$

Wherein, the time constant (τ m) is a time constant that determines the ideal response of the motor torque.

The output torque is a non-linear value to be represented by the product of the rotor flux and the current response values, with reference to Equation (8). However, in the present embodiment, as shown by Equation (9), the output torque (T m_ref) in the ideal response is calculated, as shown in Equation (9), to assume a value approximate to the response of the primary delay.

The torque deviation calculating unit 105, as shown in Equation (10), calculates a motor torque deviation (ΔT m) by calculating the difference between the output torque estimation unit (T m_est) and the torque ideal response value (T m_ref) for outputting to the integration reset judging unit 106.

$$\Delta T_m = T_{m\_est} - T_{m\_ref} \qquad (10)$$

The integration reset judging unit 106, in response to the motor torque deviation (ΔT m), determines whether or not to reset the compensation value of the additional compensation value calculating unit 108, and output to the additional compensation value calculating unit 108 a flag (flg_IRST) indicating the determination result. Conditions of judgment and the flag are shown as follows.

In case |ΔTm|≥dTm0, flag_IRST=0 (Reset inhibited)

In case |dTm|<dTm0, flag_IRST=1 (Reset done)

Note that the reset determination threshold (dT m0) is a preset threshold value to suppress the overshoot of the output torque, and set from the design or experiments. Further note that overshooting of the output torque will be described below.

When the motor torque deviation (ΔT m) is equal to the reset determination threshold (dT m0) or more, the integration reset determination unit 106 sets flag (flg_IRST) to "0" so as not to reset the compensation value. When the motor torque deviation (ΔT m) is less than the reset determination threshold value (dT m0), the integration reset determination unit 106 sets flag (flg_IRST) to "1" so as to reset the compensation value.

The excitation current command value deviation calculating unit 107, as shown in equation (11), calculates the γ-axis current value deviation (ΔI γ*) by obtaining the difference between the magnetic flux compensation γ-axis current command value (I γ1*) and the previous value of the γ-axis current command value (I γ_Z*) for outputting to the additional compensation value calculating section 108.

$$\Delta I^*_\gamma = I^*_{\gamma 1} - I^*_{\gamma\_z} \quad (11)$$

The additional compensation value calculating unit 108, depending on the state of the flag (flg_IRST), as shown in equation (12) and equation (13), integrates the γ-axis current value deviation (ΔI γ*) and multiplies with a predetermined gain to calculate a compensation value (I γ_FB) for outputting to the adder 109.

In case flag_IRST=0 (Reset inhibited), $$I^*_{\gamma\_FB} = 1/Tis\ \Delta I^*_\gamma \quad (12)$$

In case flag_IRST=1 (Reset done), $$I^*_{\gamma\_FB} = 0 \quad (13)$$

Wherein, 1/T i is an integral gain set to release a compensation value at a predetermined response from the integrated value, representing a value which is previously set by the design or experiments.

The adder 109, as shown in equation (14), calculates a γ-axis current command value (I γ2*) before current restrictive correction by adding the magnetic flux compensation γ-axis current command value (I γ1*) to the compensation value (I γ_FB) for outputting to the excitation current limiting unit 112.

$$I^*_{\gamma 2} = I^*_{\gamma 1} + I^*_{\gamma\_FB} \quad (14)$$

At this time, among the command values input to the adder 109, a command value that is compensated for by the flux response compensation unit 32 is a magnetic flux compensation γ-axis current value (I γ1*). As described above, the compensation control of the control arrangement shown in FIG. 5 intended to be such control for increasing the response speed of the excitation current in accordance with the judgment result of the compensation denervation unit 34. Therefore, the adder 109 receives the excitation current command value among the post-compensation command values of flux response compensation unit 32. On the other hand, no compensation is made for increasing the response speed with respect to the command value of the torque current. which is made use of for setting a limit value of the excitation current.

The torque current estimating unit 110, as shown in equation (15), calculates a δ-axis current estimation value (I δ_est*) by multiplying the δ-axis current command value (I δ*) with a function that includes a response time constant of the stator current (τ i) for outputting to the excitation current limit value calculating unit 111.

$$I^*_{\delta\_est} = \frac{1}{\tau_i s + 1} I^*_\delta \quad (15)$$

The excitation current limit value calculation unit 111, as shown in equation (16), calculates a γ-axis current limit value (I γlim) based on the maximum current limit (I max) and a δ-axis current estimated value (I δ_est*) for outputting to the excitation current limiting unit 112.

$$I_{\gamma lim} = \sqrt{(I_{max})^2 - (I^*_{\delta\_est})^2} \quad (16)$$

Wherein the maximum current limit (I max) is a current value indicating the rated current of the motor 3 and is a value determined in advance at the design stage.

The excitation current limiting unit 112 calculates the γ axis current command value (I γ*) by applying a restriction of the γ-axis current limit value (±I γlim) on the input γ-axis current value (I γ2*) for outputting to the rotor flux estimation unit 102, the adder 41, etc.

The excitation current limiting unit 112 calculates the upper limit γ-axis current limit value (+I γlim) as the γ-axis current command value (I γ*), when the γ-axis current command value (I γ2*) is higher than the upper limit γ-axis current limit value (I γlim).

The torque current limiting unit 101 calculates the current limit value (−Imax_δ) as the γ-axis current command value (I γ*), when the γ-axis current value (I γ2*) is less than the lower limit of the γ-axis current limit value (−I γlim) than the lower current limit value I is calculated as. Also, the torque current limiting unit 101, when the γ-axis current command value (I γ2*) is higher than the lower current limit of the γ-axis current command value (−I γlim), then no restriction by the limiting values is provided and the γ-axis current command value (I γ2*) is calculated as a γ-axis current value (I γ*).

Figure 6:
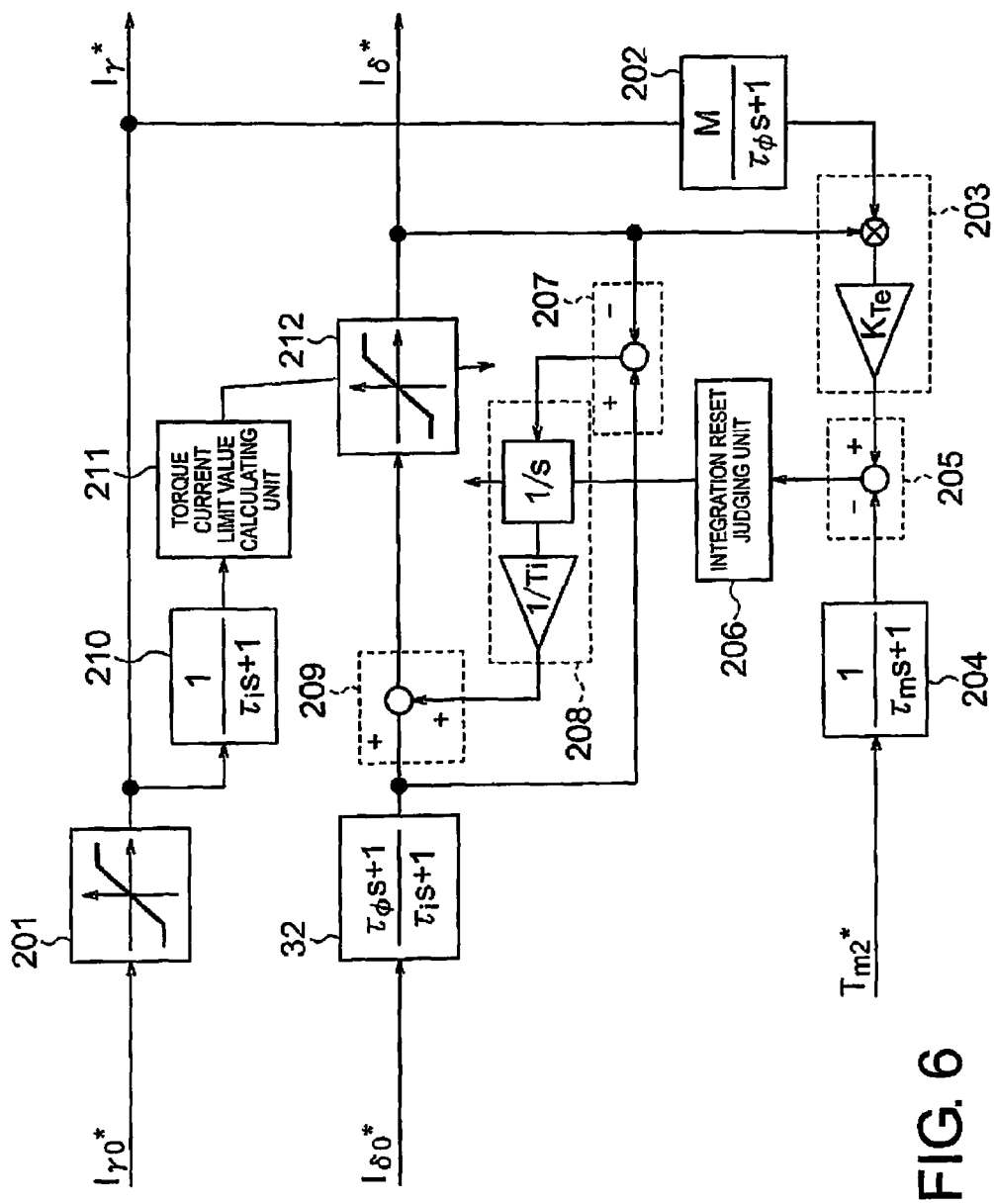
FIG. 6 is a block diagram of a torque current compensation control unit of FIG. 4.

Now, with reference to FIG. 6, a description is given of a detailed configuration of a torque current compensation control unit 200. FIG. 6 is a block diagram showing the configuration of a magnetic flux response compensation unit 32 and the torque current compensation control unit 100.

The torque current compensation control unit 200 includes an excitation current limiting unit 201, a rotor flux estimation unit 202, an output torque estimation unit 203, an ideal response torque calculating unit 204, a torque deviation calculating unit 205, an integration reset determination unit 206, a torque current command value deviation computing unit 207, an additional compensation value calculating unit 208, an adder 209, an excitation current estimation unit 210, a torque current limit value calculating unit 211, and a torque current limiting unit 212.

The excitation current limiting unit 201 calculates a γ-axis current command value (I γ0) by applying a restriction of a current limit (±Imax_γ) on the input basic γ-axis current command value (I γ0*). The current limit value (±Imax_γ) is defined by the upper and lower limits, and is a threshold which is previously set by the design or experiments.

The excitation current limiting unit 201 outputs the calculated γ-axis current command value (I γ0) to the output torque estimation unit 203, the excitation current estimation unit 210, and the subtractor 41 and the like.

The rotor flux estimation unit 202, similarly to the rotor flux estimation unit 102, based on the γ-axis current command value (I γ*), calculates the rotor flux estimation value (φ est_z) for outputting to the output torque estimation unit 203.

The output torque estimation unit 203, similarly to the output torque estimation unit 103, calculates an output torque estimation value (T m_est) based on the rotor flux estimation value (φ est_z) and the δ-axis current command value (I δ) for outputting to the torque deviation calculating unit 205.

The ideal response torque calculating unit 204, similarly to the ideal response torque calculating unit 104, based on the post-damping torque command value (T m2*), calculates a torque ideal response value (T m_ref) for outputting to the torque deviation calculating unit 205.

The torque deviation calculating unit 205, similarly to the torque deviation calculating unit 105, based on the output torque estimation unit (T m_est) and the torque ideal response value (T m_ref), calculates a motor torque deviation (ΔT m) for outputting to the integration reset determination unit 206.

The integration reset determination unit 206, similarly to the integration reset determination unit 106, in response to the motor torque deviation (ΔT m), determines whether or not to reset the compensation value of the additional compensation value calculating unit 208, and outputs a flag (flg_IRST) indicating the determination result the flag to the additional compensation calculating unit 208.

The torque current command value deviation calculating unit 207, as shown in equation (17), by pursuing the difference between the magnetic flux compensation δ-axis current command value (I δ1*) and the previous value of the δ axis current command value (I δ_Z*), calculates a δ-axis current command value deviation (ΔI δ*) for outputting to the additional compensation value calculating unit 208.

$$\Delta I^*_\delta = I^*_{\delta 1} - I^*_{\delta\_z} \tag{17}$$

The additional compensation value calculating unit 208, in accordance with the state of the flag (flg_IRST), as shown in equation (18) and equation (19), integrates the δ-axis current command value deviation (ΔI δ*) and multiplies with a predetermined gain to thereby calculate a compensation value (I δ_FB) for outputting to the adder 209.
In case in which flag_IRST=0 (Reset inhibited), $$I^*_{\delta\_FB} = \frac{1}{T_i s} \Delta I^*_\delta \tag{18}$$

In case in which flag_IRST=0 (Reset done)

$$I^*_{\delta\_FB} = 0 \tag{19}$$

Here, 1/T i is the preset integral gain to release a compensation value at a predetermined response with respect to the integrated value and previously set by the design or experiments.

The adder 209, as shown in equation (20), by adding the magnetic flux compensation δ-axis current command value (I δ1*) and the compensation value (I δ_FB), calculates the δ-axis current command value (I δ2*) prior to a current limiting compensation for outputting to the torque current limiting unit 212.

$$I^*_{\delta 2} = I^*_{\delta 1} + I^*_{\delta\_Fb} \tag{20}$$

At this time, among the command values which are input to the adder 209, the command value that has been compensated for by the flux response compensation unit 32 is a magnetic flux compensator δ-axis current command value. As described above, the compensation control of the control arrangement shown in FIG. 6 is intended to increase the response speed of the torque current in response to the determination result of the compensation determination unit 34. Therefore, among the command values after compensation of the magnetic flux response compensation unit 32, the torque current command value is input to the adder 209. On the other hand, the command value of the excitation current does not undergo any compensation and is used for setting the limit value of the torque current.

The excitation current estimation unit 210, as shown in equation (21), by multiplying the basic γ axis current command value (I γ0*) with a function containing the response time constant of the stator current (τ i), calculates a γ-axis current estimation value (I γ_est*) for outputting to the torque current limit value calculating unit 211.

$$I^*_{\gamma\_est} = \frac{1}{\tau_i s + 1} I^*_\gamma \tag{21}$$

Setting of the time constant (τ i) is similar to equation (15). Note that this control process may be omitted when the γ-axis current command value is constant.

The torque current limit value calculating unit 211, as shown in equation (22), based on the maximum current limit (I max) and the γ-axis current estimation value (I γ_est*), calculates the δ-axis current limit value (I δlim) for outputting to the torque current limiting unit 212.

$$I_{\delta lim} = \sqrt{(I_{max})^2 - (I_{\gamma\_est})^2} \tag{22}$$

The torque current limiting unit 212, by applying restriction of the δ-axis current limit value (±I δlim) to the input δ-axis current command value (I δ2*), calculates the δ-axis current command value (I δ *) for outputting to the rotor flux estimation unit 202 and the subtractor 41 and the other operation unit.

Now, among the control of the compensation control unit 35, a description is give of the control of the excitation current compensation control unit 100 with reference to FIG. 5.

When the compensation determination unit 34 determines that the amount of change in the basic γ-axis current command value (dI γ0*) is larger than the determination threshold value (I 0) and the change of the excitation current is determined to be large, the excitation current command value is compensated for by amplifying the excitation current command value such that the phase of the excitation current command value will be advance to increase the response speed of the excitation current.

Assuming (and unlike the present embodiment) that, with respect to the amplified excitation current command value, the excitation current is allowed to flow to the maximum current limit value, a large exciting current would flow transiently due to the advance compensation. However, from the viewpoint of protection against over-current to the motor, it is impossible to flow in the motor a current exceeding the maximum current limit value. If the excitation current would be allowed to flow to the maximum current limit, all the current will flow to the exciting current, and it is impossible to flow a torque current. As a result, it is not possible to generate a torque. Rather, the torque response is delayed.

Therefore, in the present embodiment, the excitation current compensation control unit 100, based on the basic δ-axis current command value (I δ0*), estimates a torque current (equivalent to the δ-axis current estimation value (I δ_est*)) and, based on the estimated torque current value, calculates the γ-axis current limit value (I γlim). This control corresponds to the control by the torque current estimation unit 110 and the excitation current limit value calculating unit 111 in the control block in FIG. 5.

Thus, in the present embodiment, in order for the torque current not to become zero, since it is possible to add restrictions to the amplified excitation current command value, the output torque can be prevented from being zero, which would lead to occurrence of a dead time.

The γ-axis current command value (I γ2*) which has been amplified by the flux response compensation unit 32 is subject to restriction by the excitation current limiting unit 112. Out of the amplified γ-axis current command value of the (I γ2*), a part of the command value which is restricted by the γ-axis current limit value (I γlim) is not used for compensation of the excitation current. On the other hand, by control of the motor 3 at the excitation current command value in excess of the γ-axis current limit value (I γlim), as described above, there is a possibility that the torque current becomes zero.

Therefore, the excitation current compensation control unit 100 calculates a compensation value based on the portion of the command value of the amplified γ-axis current value (I γ2*), which has been restricted by the γ-axis current limit value (I γlim), and, by applying a feedback, adds to the γ-axis current command value (I γ1*). In addition, the excitation current compensation control unit 100 calculates the compensation value to be added by integrating the difference between γ-axis current command value (I γ1*) and γ-axis current limit value (I γlim), added by integrating We have calculated the compensation value.

Even when such a state in which the amplified γ-axis current command value (I γ1*) exceeds the γ-axis current limit value (I γlim) is continued, the command value corresponding to the portion exceeding the γ-axis current limit value (I γlim) will be accumulated by integration. Then, when the γ-axis current command value (I γ1*) falls below the γ-axis current limit value (I γlim), the compensation value accumulated will be added to the γ-axis current command value limit value (I γ1*), which is lower than the γ-axis current limit value (I γlim). This control corresponds to the controls by the excitation current command value deviation calculating unit 107, the additional compensation value calculating unit 108, the adder 109, and the excitation current limiting unit 112 in the control block in FIG. 5.

Thus, after the γ axis current command value (I γ1*) has fallen below the γ-axis current limit value (I γlim) (i.e., the current limit has been released with respect to the γ-axis current value (I γ1*)), it is possible to allow the portion of the excitation current command value, which has not been able to be compensated for due to the current restriction. Further, a sufficient excitation current is retained after restriction release of the γ-axis current value (I γ1*) so that a large excitation current may be maintained. As a result, it is possible to increase the torque response.

Further, the excitation current compensation control unit 100 calculates a difference between the output torque of the motor 3 and the torque command value by calculating a difference between the output torque estimate (T m_est) and the torque ideal response value (T m_ref), and, based on the difference, sets the timing for resetting the compensation value. Note that the output torque estimate (T m_est) corresponds to the output torque, and the torque ideal response value (T m_ref) corresponds to the torque command value. This control corresponds to the rotor flux estimation unit 102, the output torque estimation unit 103, the ideal response torque calculating unit 104, the torque deviation calculating unit 105 and the integration reset determination unit 106 of the control block in FIG. 5.

Here, unlike the present embodiment, among the above conditions of the integration reset determination unit 106, a description is given of a case in which, despite the condition |ΔT m|<dT m0 being satisfied, resetting of the compensation value is not made.

When the output torque estimate value (T m_est) is small compared to the torque ideal response value (T m_ref) and thus the motor torque deviation (ΔT m) is less than the reset determination threshold value (dT m0), if the additional compensation would be continued without resetting the compensation value by the additional compensation value calculating unit 108, the excitation current will continue to rise by the additional compensation although the motor 3 is outputting a torque close to the torque ideal response value (Tm_ref). In this instance, when the high torque is continuously output, by the additional compensation, the output torque will exceed a target torque, which will likely to generate overshooting of the output torque.

Therefore, in the present embodiment, the excitation current compensation control unit 100, in order to prevent this overshoot, sets the reset determination threshold (dT m0). When the motor torque deviation (ΔT m) is less than the reset determination threshold, the compensation value is controlled to be reset.

Thus, in the present embodiment, since the compensation value is configured to be converged to zero after the difference between the torque command value and the output torque has reduced, the excitation current command value subject to the additional compensation may be decreased to the command value which is compensated for by the flux response compensation unit 32. Consequently, without causing an overshoot of the actual torque, it is possible to match the actual torque to the torque command value.

Now, among the control of the compensation control unit 35, a description is given of the control of the torque current compensation control unit 200 with reference to FIG. 6. The control of the torque current of the torque current compensation control unit 200 is similar to the control of the excitation current of the excitation current compensation control unit 100. Also, the control of the excitation current of the torque current compensation control unit 200 is similar to control of the torque current of the excitation current compensation control unit 100.

The torque current compensation control unit 200, based on the basic γ axis current command value (I γ0*), estimates the torque current (equivalent to the γ-axis current estimated value (I γ_est*)), and, based on the estimated torque current value, calculates the δ-axis current limit value (I δlim). This control corresponds to the control of the excitation current estimation unit 210 and the excitation current limit value calculating unit 211 of the control block in FIG. 6.

Also, the torque current compensation control unit 200 calculates a compensation value based on the portion of the command value of the amplified δ-axis current value (I δ2*), which has been restricted by the δ-axis current limit value (I δlim), and, by applying a feedback, adds to the δ-axis current command value (I δ1*). In addition, the torque current compensation control unit 200 calculates the compensation value to be added by integrating the difference between δ-axis current command value (I δ1*) and δ-axis current limit value (I δlim).

This control corresponds to a torque current command value deviation calculating unit 207, the additional compensation value calculating unit 208, the adder 209, and the torque current limiting unit 212 of the control block in FIG. 6.

Further, the torque current compensation control unit 200 calculates a difference between the output torque of the motor 3 and the torque command value by calculating a difference between the output torque estimate (T m_est) and the torque ideal response value (T m_ref), and, based on the difference, sets the timing for resetting the compensation value. This control corresponds to the rotor flux estimation unit 202, the output torque estimation unit 203, the ideal response torque calculating unit 204, the torque deviation calculating unit 205 and the integration reset determination unit 206 of the control block in FIG. 6.

Figure 7:
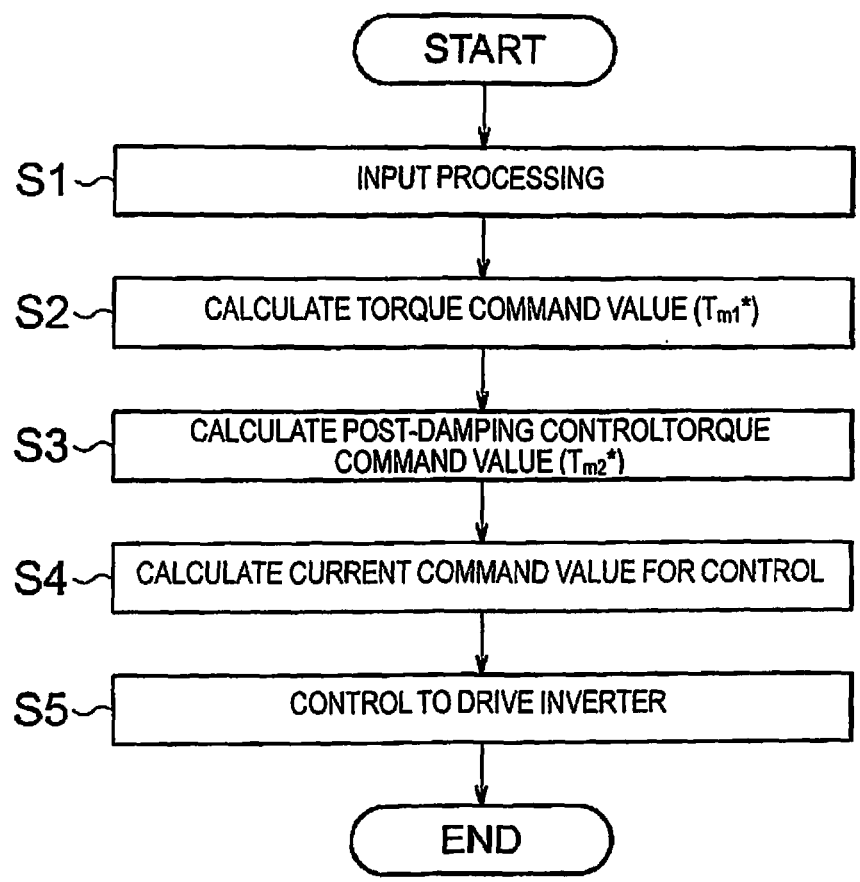
FIG. 7 is a flowchart showing a control procedure of the motor controller in FIG. 1.

Now, with reference to FIG. 7, a description will be given of control procedure of the motor controller 20. FIG. 7 is a flow chart showing a control procedure of the motor controller 20. Note that the control flow of FIG. 7 is executed repeatedly at a predetermined cycle.

In step S1, the motor controller 20 acquires, as the input process, a vehicle speed, an accelerator opening and the like. In step S2, the motor torque control unit 21, based on the input accelerator opening, etc., calculates a torque command value (T m1*). In step S3, the damping control unit 22, by performing the vibration suppression control based on the torque command value (T m1*), etc., calculates a post-damping control torque command value (T m2*).

In step S4, the current command value calculating unit 30 in the current control unit 23, based on the post-damping control torque command value (T m2*), etc., calculates γδ-axis current command values (I γ *, I δ *). Note that the detailed control procedure of step S4 will be described below.

Subsequently, in step S5, the subtractor 41 and the like included in the current controller 23 generates a drive signal (switching signal) so as to output the γδ-axis current command values (I γ *, I δ*) from the motor 3 for outputting to the inverter 2 to thereby control the inverter 2.

Figure 8:
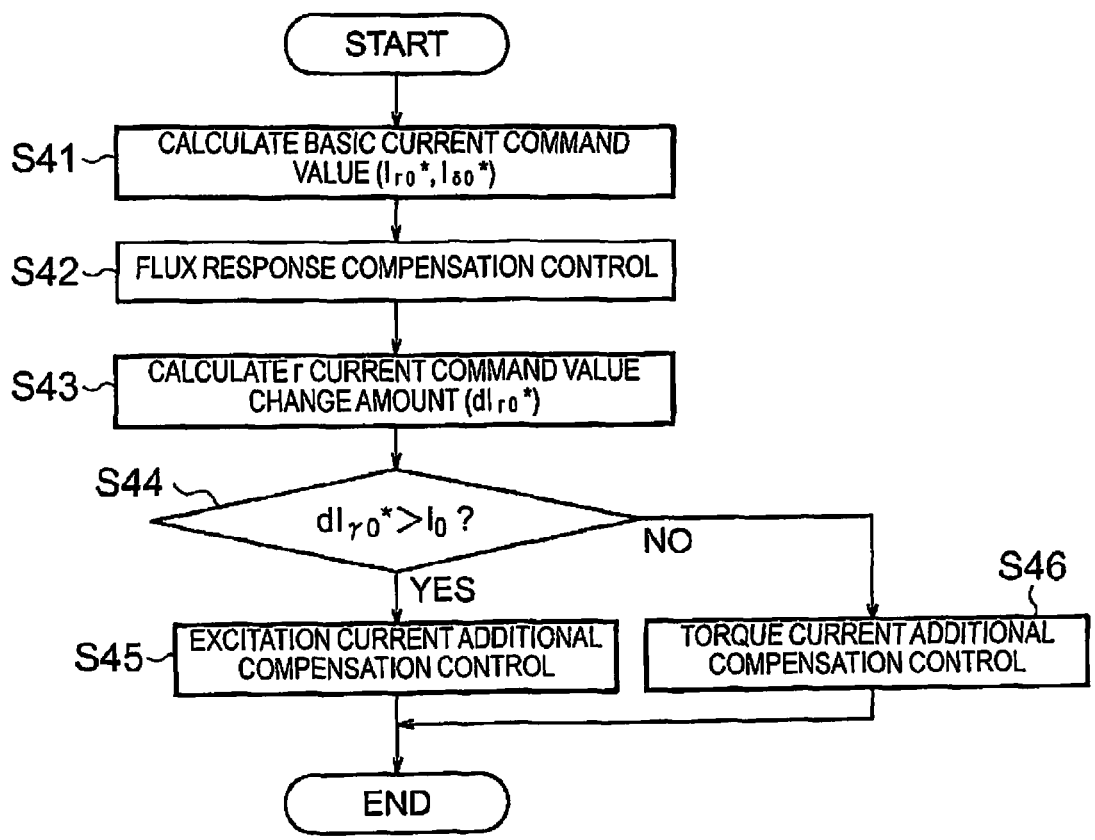
FIG. 8 is a flow chart showing the control procedure of step 4 in FIG. 7.

Now, with reference to FIG. 8, a description will be given of a control procedure of step S4. FIG. 8 is a flow chart showing a control procedure of step S4.

Subsequent to the control in step S3, in step S41, the basic current command value calculating unit 31, based on the post-damping control torque command value (T m2*), etc., calculates basic γδ-axis current command values (I γ0*, I δ0*). In step S42, the magnetic flux response compensation unit 32, by amplifying the basic γ axis current command values (I γ0*, I δ0*), compensates for the delay of the rotor flux response of the drive motor 3 and calculates magnetic flux compensation γδ axis current command values (I γ1*, I δ1*).

In step S43, the excitation current command value change amount calculating unit 33, based on the magnetic flux compensation γ-axis current command value, based on (I γ1*), calculates the amount of change in the γ-axis current command value (dI γ0*). In step S44, the compensation determination unit 34 compares the amount of change of the γ-axis current value (dI γ0*) and a determination threshold value (I 0).

When the amount of change in the γ-axis current command value (dI γ0*) is greater than the determination threshold value (I 0), the compensation control unit 35 performs a control such that the excitation current is additionally compensated for by the excitation current (step S45). On the other hand, when the amount of change in the γ-axis current value (dI γ0*) is equal to or less than the determination threshold (I 0), the compensation control unit 35 is configured to control to additionally compensate for the torque current by the torque current compensation control unit 100 (step S46). Subsequently, following completion of the additional compensation control in steps S45, S46, after completion of the control flow of step S4, control proceeds to step S5.

Figure 9:
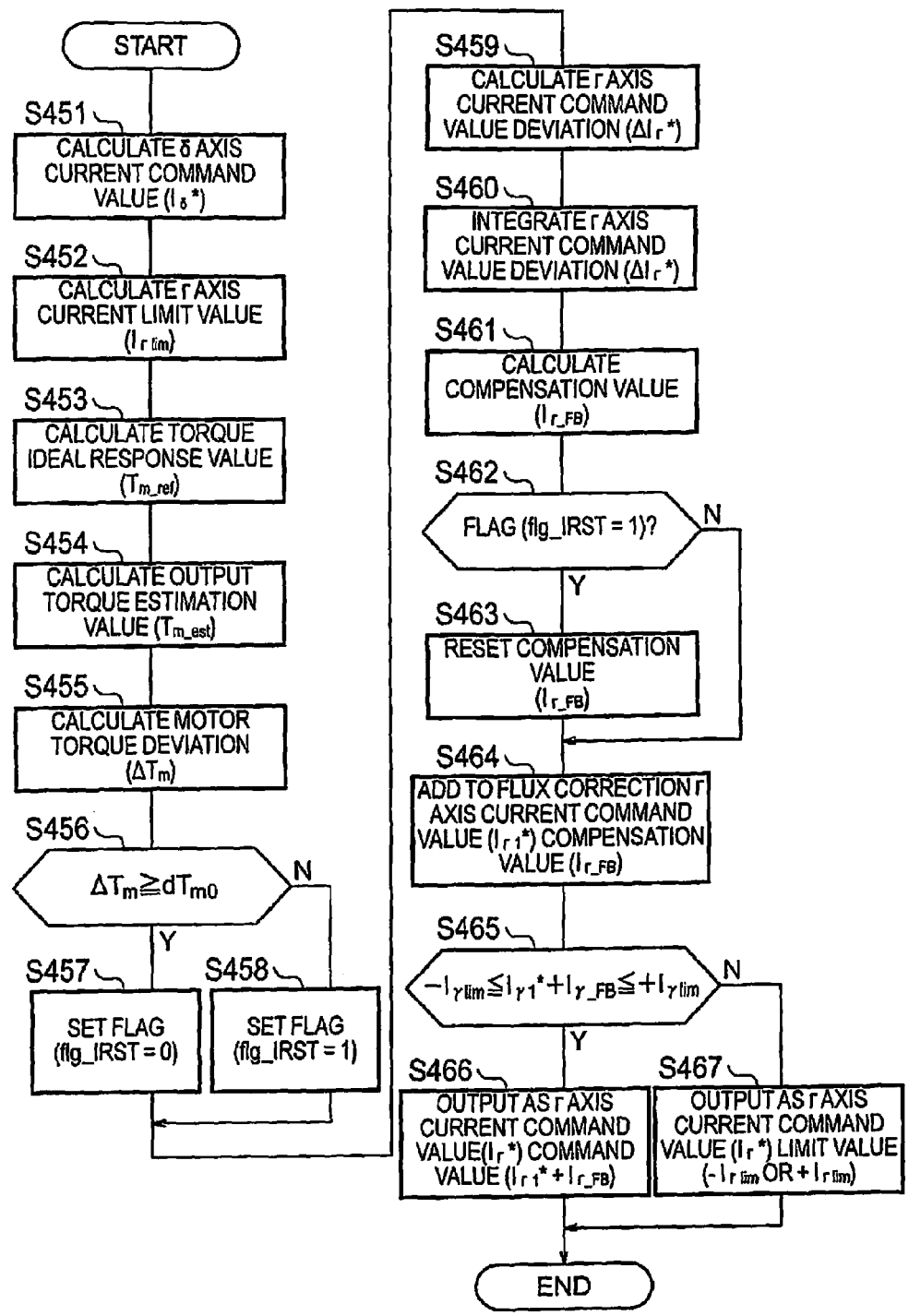
FIG. 9 is a flow chart showing a control procedure of step S45 in FIG. 8.

Now, with reference to FIG. 9, a description is given of the control procedure of step S45. FIG. 9 is a flow chart showing a control procedure of step S45.

In the control in step S45, first in step S451, the torque current limiting unit 101 applies to the basic δ-axis current command value (I δ0*) a restriction of current limit (±Imax_δ) to thereby calculate a δ-axis current command value (I δ*).

The torque current estimation unit 110, on the basis of the δ-axis current command value (I δ*), estimates the δ-axis current estimated value (I δ_est*). In addition, the excitation current limit value calculating unit 111, based on the δ-axis current estimated value (I δ_est*), calculates the basic γ-axis current limit value (I γlim) (step S452).

In step S453, the ideal response torque calculating unit 104, based on the post-damping control torque command value (T m2*), calculates the torque ideal response value (T m_ref).

The rotor flux estimation unit 102, based on the previous value (I γ_Z*) of the γ-axis current command value (I γ *), calculates the rotor flux estimation value (φ est_z). Moreover, the output torque estimation unit 103, based on the rotor flux estimate (φ est_z), calculates the output torque estimation value (T m_est) (step S454).

In step S455, the torque deviation calculating unit 105, by calculating a difference between the torque ideal response value (T m_ref) and the output torque estimated value (T m_est), calculates a motor torque deviation (ΔT m). In step S456, the integration reset determination unit 106 compares the motor torque deviation (ΔT m) and the reset determination threshold (dT m0).

When the motor torque deviation (ΔT m) is the reset determination threshold (dT m0) or above, the integration reset determination unit 106 sets the flag (flg_IRST) to "0 (reset inhibited or disabled)" (step S457). When the motor torque deviation (ΔT m) is less than the reset determination threshold value (dT m0), the integration reset determination unit 106 sets the flag (flg_IRST) to "1 (reset done or implemented)" (step S458).

In step S459, the excitation current command value deviation calculating unit 107, by calculating the difference between the magnetic flux compensation γ-axis current command value (I γ1*) and the previous value (I γ_Z*) of the γ-axis current command value, calculates the γ-axis current command value deviation (ΔI γ *). In step S460, the additional compensation value calculating unit 108 calculates the integrated value by integrating the γ-axis current command value deviation (ΔI γ *). In step S461, the additional compensation value calculating unit 108, by multiplying a predetermined gain with the integrated value, calculates the compensation values (I γ_FB).

In step S462, the additional compensation value calculating unit 108 determines whether or not the flag (flg_IRST) is "1". When the flag (flg_IRST) is "1", at step S463, the additional compensation value calculating unit 108, by setting the compensation value (I γ_FB) to zero, resets the compensation value (I γ_FB). On the other hand, when the flag (flg_IRST) is "1", the compensation value (I γ_FB) will not be reset and control proceeds to step S464.

In step S464, the adder 109, by adding the flux compensation γ-axis current command value (I γ1*) and the compensation value (I γ_FB), calculates the γ-axis current value (I γ2*) prior to the current limiting compensation.

In step S465, the excitation current limiting unit 112, in order to put a restriction on the γ-axis current command value (I γ2*) prior to the current limiting compensation by the γ-axis current limit value (I γlim), compares the relative magnitude between the γ-axis current command value (I γ2*) and the γ-axis current limit value (I γlim).

When the γ axis current command value (I γ2*) is within the range between the negative side limit value (−I γlim) and the positive side limit value (+I γlim), the excitation current limiting unit 112, without posing a restriction on the command value, outputs the γ axis current command value (I γ2*) as the γ-axis current value (I γ *) (step S466). On the other hand, when the γ-axis current command value (I γ2*) is outside the range between the negative-side limit value (−I γlim) and the positive limiting value (+I γlim), the excitation current limiting unit 112, by applying a limit to the command value, output the γ-axis current limit value (−I γlim or I γlim) as the γ-axis current command value (I γ *) (step S466). Then, after completing steps S466, S467, through control flow of the step S4, control proceeds to step S5.

After step S467, in step S459 of the control flow in the next calculation cycle, the previous value of the γ-axis current command value (I γ_Z*) will be the γ-axis current limit value (I γlim). In addition, the difference between the magnetic flux compensation γ-axis current command value (I γ1*) and the γ-axis current limit value (I γlim) represents a portion of the γ-axis current limit value (I γlim) which has been subject to restriction by the γ-axis current limit value (I γlim). Furthermore, by integrating the difference in the control of step S460, it is possible to accumulate the partial command value that could not be reflected in the compensation for the excitation current.

Also, following step S467, in the next calculation cycle of the control flow, when the flux compensation γ-axis current command value (I γ1*) is less than the γ-axis current limit value (I γlim), then in step S464 in the subsequent control flow, the compensation value will be added to the excitation current command value (I γ1*) which is less than the γ-axis current limit value (I γlim).

Note that, since the control flow of step S46 is substantially similar to the control flow in which, in steps S451 to S467 shown in FIG. 9, the control pertaining to the excitation current and the control pertaining to the torque current are interchanged, a description thereof will be omitted.

Figure 10A:
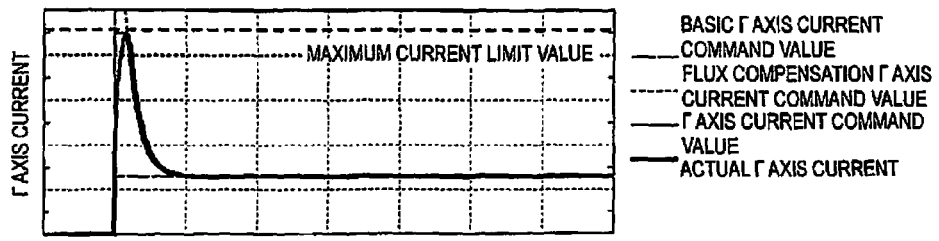
FIGS. 10A-10D are graphs showing a torque response of the motor controlled by a motor control device pertaining to a comparative example.
Figure 10B:
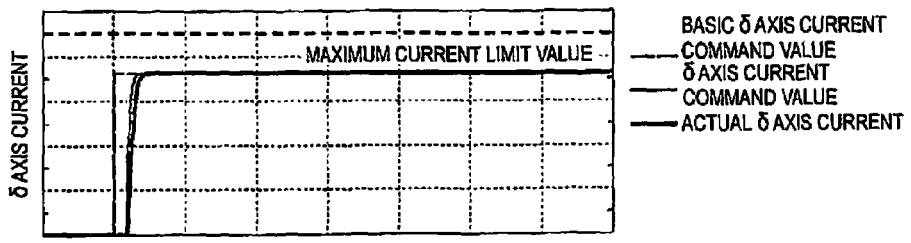
Figure 10C:
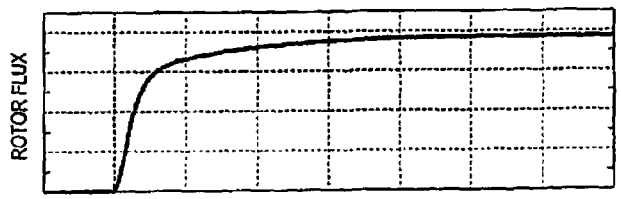
Figure 10D:
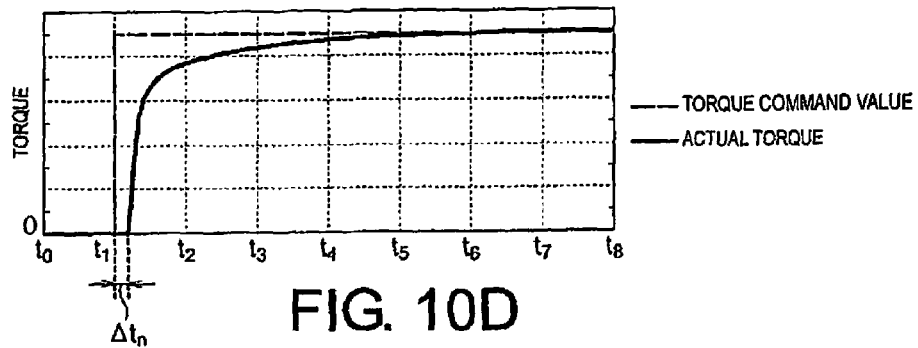
Figure 11A:
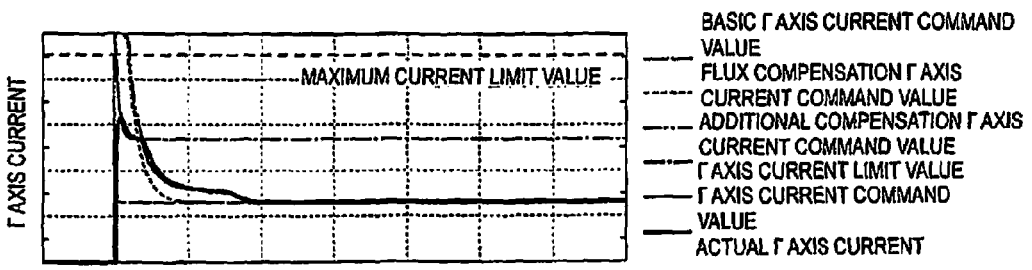
FIGS. 11A-11D are graphs showing a torque response of the motor controlled by a motor control device according to the present invention.
Figure 11B:
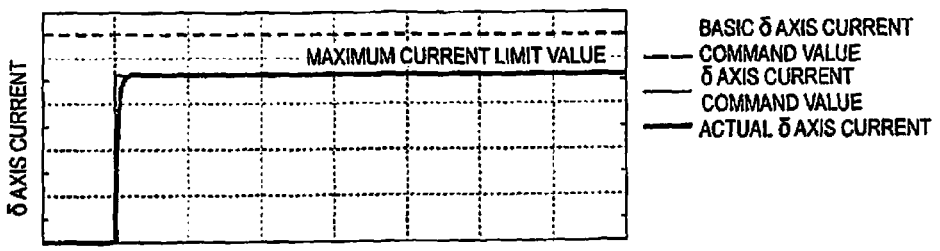
Figure 11C:
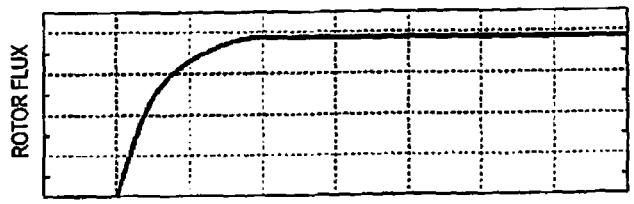
Figure 11D:
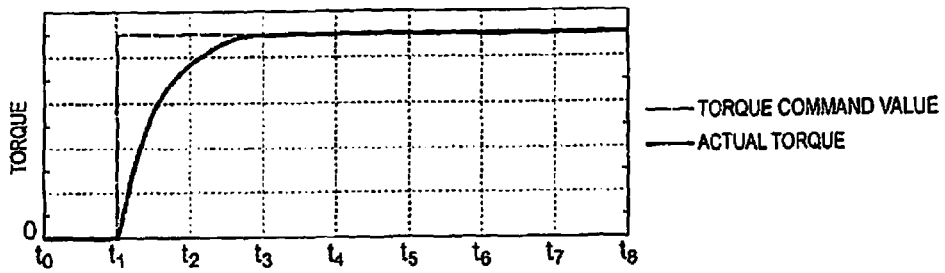

Now, a description is given of the effect of the motor control device pertaining to the present invention with reference to FIGS. 10A-D and FIGS. 11A-D. FIGS. 10A-D are characteristic of a comparative example, while FIGS. 11A-D show a characteristic of the present invention. In FIGS. 10A-D, FIGS. 11A-D, FIGS. 10A, 11A show the time characteristics of the excitation current (γ-axis current); FIGS. 10B, 11B show the time characteristic of the torque current (δ-axis current); FIGS. 10C, 11C show the time characteristic of the rotor flux; and FIGS. 10D, 11D are graphs showing time characteristics of the torque. Also, in FIGS. 10, 11, an actual torque, an actual γ-axis current, and an actual δ-axis current respectively indicate the output torque of an actual motor 3 and current actually flowing through the motor 3.

In the comparative example, similarly to the magnetic flux response compensation unit 32, by amplifying the γ-axis current command value, a phase compensation is performed to improve the rotor flux response. In addition, a restriction is posed by the maximum current limit on the excitation current command value which has been compensated for by this phase compensation.

Below, while comparing FIGS. 10A-D and 11A-D, in an operational example in which a torque command value is increased stepwise such as in a vehicle starting acceleration and the like from a stopping state, a description will be given of the torque response performance.

At time t1, as the vehicle starting acceleration from stopping state, the torque command value rises stepwise, and the basic γδ-axis current command value also rise in a stepwise manner. By the magnetic flux response compensation unit 32, through the phase compensation to improve the rotor flux response, the flux compensation γ-axis current command value exhibits a transient large value.

In Comparative Example, with the maximum current limit value being set as the upper limit value of the current amplitude, the excitation current is amplified so as to distribute current to the γ-axis current as compared to the δ-axis current. Thus, in the Comparative Example, since the current is used up only for γ-axis current value up to the maximum current limit, the current value that can be used for the δ-axis current remained remains zero. Therefore, a dead time (corresponding to Δt n in FIGS. 10A-D) is generated in which no torque can be produced. Moreover, since the γ-axis current is limited by the rated current limit value (equivalent to a maximum current limit), a desired current to improve the rotor flux response will not flow so that desired rotors flux responses cannot be realized.

Then, at a time between the time t1 and t2, when the magnetic flux compensator γ-axis current command value decreases and falls below the value of the maximum current limit value, it is possible to flow a δ-axis current so that torque starts rising.

At time t2, although the rotor flux rises up to 70 to 80 percent of the steady-state value, the magnetic flux compensation γ-axis current command value converges almost to the basic γ-axis current command value. At time t2 and thereafter, the γ-axis current is maintained at about constant value, and, with a delay of a time constant determined by the characteristics of the rotor, the rotor flux gradually rises. Consequently, due to the slow response speed or a slow torque response, it takes until time t5 to t6 for the time to converge to a final torque command value of the actual torque.

In the present invention, at time t1, torque command value rises stepwise, and the basic γδ-axis current command value also rise stepwise. With respect to the δ-axis current, according to the present invention, while applying a limit of the maximum current limit (corresponding to a current limit value (±Imax_δ)) to the δ axis current command value, the δ-axis current is allowed to flow. Therefore, in the period in which a dead time has been caused in the Comparative Example, according to the present invention, the δ-axis current command value will not be made zero so that it is possible to launch the δ-axis current quickly. As a result, the torque also rises from the time t1 without waste time.

As for γ-axis current, due to the phase compensation by the magnetic flux response compensation unit 32 to improve the rotor flux response, the flux compensation γ-axis current command value rises transiently to a large value. Further, the limit applied to the magnetic flux compensation γ-axis current command value is a portion obtained by subtracting the δ-axis current command value from the maximum current limit value so as to set the maximum current limit value to the current amplitude, and the γ-axis current limit value (equivalent to current limit value (±I γlim)) is determined.

Therefore, in accordance with the rise of the δ-axis current command value, the γ-axis current value is limited and depressed.

Thus, although the torque response immediately after the time t1 is faster without a dead time compared to the Comparative Example, during the period from time t1 to t2, the rising amount of the actual torque is temporarily smaller than that of the Comparative Example. However, at the time t2, the magnitude of the actual torque is substantially the same order.

Further, in the period between time t1 and t2, while the magnetic flux compensation γ-axis current command value exceeds the current limit value of the excitation current, by accumulating and integrating the difference between the magnetic flux compensation γ-axis current command value and the current limit value, the command value will be compensated for and γ-axis current command value which will be input to the additional compensation γ-axis current command value (corresponding to the γ-axis current command value (I γ2*) input to the excitation current limiting unit 112) will be increased gradually. When the magnetic flux compensation γ-axis current command value decreases and falls below the γ-axis current limit value, the additional compensating γ-axis current value may be maintained at a value greater than the magnetic flux compensator γ-axis current value by the integral value that has been accumulated. Then, after the current limit release, a portion of the flux compensation γ-axis current command value that could not be effective due to the current limit may be applied at the timing of release of the current limit.

Thus, at the time t2 and thereafter, a longer convergence time to reach the command value is required in the Comparative Example due to the deterioration in torque response. In contrast, according to the present invention, the torque may be continuously increased so that the target command value has been achieved before time t3.

Furthermore, in the present invention, the output torque substantially matches the torque command value immediately before time t3, it is detected that the change amount of the output torque is reduced and, by converging the integrated value of the compensation value to zero, the additional compensation γ-axis current command value is reduced to the magnetic flux compensation γ-axis current command value. Therefore, according to the present invention, without causing an overshoot of the actual torque, the actual torque can be matched to the torque command value.

As described above, in the present embodiment, the basic γδ-axis current command values (I γ0*, I δ0*) are amplified to compensate for the delay in the rotor flux response to calculate the flux compensation γδ-axis current command values (I γ1*, I δ1*). The γδ-axis current command values (I γ2*, I δ2*) are restricted by the γδ-axis current limit values (I γlim, I δlim). Compensation values (I γ_FB, I δ_FB) are calculated based on the flux compensation γδ-axis current command values (I γ1*, I δ1*) and the γδ-axis current command value (I γ *, I δ *) restricted by the γδ-axis current limit values (I γlim, I δlim). The flux compensation γδ-axis current command values (I γ1*, I δ1*) and the compensation values (I γ_FB, I δ_FB) are added to calculate the γδ-axis current command values (I γ2*, I δ2*). A portion of the command value of the flux compensation γδ-axis current command values (I γ1*, I δ1*), which has been subject to restriction or limitation by the γδ-axis current limit values (I γlim, I δlim) is calculated as the compensation values (I γ_FB, I δ_FB). Thus, when the magnetic flux compensator γ-axis current command values (I γ1*, I δ1*) are restricted by the limit value, a portion of the magnetic flux compensator γδ-axis current command values (I γ1*, I δ1*) may be added for additional compensation upon the magnetic flux compensator γδ-axis current command values (I γ1*, I δ1*) falling below the limit value. Therefore, the torque responsiveness may be improved.

Also, in the present embodiment, by integrating the difference between the magnetic flux compensation γδ-axis current command value (I γ1*, I δ1*) and the γδ-axis current limit value (I γlim, I δlim), the compensation value (I γ_FB, I δ_FB) is calculated. Thus, since a portion of the magnetic flux compensation γδ-axis current command value that could not be output by the current limit (I γ1*, I δ1*) is accumulated, when the flux compensation γδ-axis current command value (I γ1*, I δ1*) becomes smaller than the limit value, it is possible to output the accumulated integrated value as the compensation value. Moreover, even after the current limit is released, since it is possible to maintain the excitation current in a high state, against abrupt change of the torque command value, it is possible for the actual torque to converge quickly to the command value.

Also, in the present embodiment, a predetermined gain (1/Ti) is multiplied with the integrated value which integrates the difference between the magnetic flux compensation γδ-axis current command value (I γ1*, I δ1*) and the γδ-axis current limit value (I γlim, I δlim) to calculate the compensation value (I γ_FB, δ_FB). This makes it possible to output the accumulated integration value with a desired response.

Also, in the present embodiment, the compensation value (I γ_FB, I δ_FB) I is suppressed by adjusting the gain (1/T i) such that the γδ-axis current command value (I γ2*, I δ2*) after releasing the current limit is not transiently high, by adjusting. That is, in the present embodiment, after the current limitation is released, the accumulated value is released to the integrated value to be added to the magnetic flux compensation γδ-axis current command value (I γ1*, I δ1*). Further, by the time constant of the rotor flux, the actual rotor flux rises later with a delay than forecast from the magnetic flux compensation γδ-axis current command value (I γ1*, I δ1*). Until the current limit is released, the rotor flux is has risen somewhat, with the rotor flux rise, the compensation value of the integrated value will be added to the magnetic flux compensation γδ-axis current command value (I γ1*, I δ1*). Therefore, without gain adjustment, if an integrated value is discharged as it is and added to the magnetic flux compensation γδ-axis current command value (I γ1*, I δ1*), the rotor flux will be launched transiently steeper than necessary so that there is a risk of overshoot of the output torque. Therefore, in the present embodiment, the integrated value is subjected to gain adjustment to prevent overshoot of the output torque so that the steady-state value is controlled according to the command value and the responsiveness is improved in the transient responsiveness only.

Further, in the present embodiment, based on the difference between the post-damping control torque command value (T m2*) and the output torque, the compensation value (I γ_FB, I δ_FB) will be reset. This makes it possible to avoid transient overshoot of the rotor flux and torque.

Also, in the present embodiment, based on the basic γδ-axis current command value (I γ0*, I δ0*) which is not compensated for by the magnetic flux response compensation unit 32, the current value of those which are not compensated is estimated. Further, based on the estimated current value (I γ_est*, I δ_est*), the γδ-axis current limit value (I γlim, I δlim) is calculated. Thus, since a limit value of the current command value to be additionally compensated is provided, occurring of dead time as describe above in the Comparative Example will be prevented to occur, for example.

Also, in the present embodiment, based on the current command value which is not compensated by the magnetic flux response compensation unit 32 and the maximum current limit (I max), the γδ-axis current limit value (I γlim, I δlim) is calculated. However, among the current command value, the maximum current limit (Imax) and the (I γlim, I δlim), equation (16) or equation (22) is satisfied. Note that equations (16) and (22) includes the γδ-axis current estimated value (I γ_est*, I δ_est*). However, in place of the estimated value, the basic γδ-axis current command value (I γ0*, I δ0*) may be used.

Thus, the current command value which does not subject to compensation for the high response processing is reliably allowed to flow. Thus, the dead time due to the arrangement in which current will not be able to flow in one of the γδ axes may be eliminated to thereby produce the torque reliably.

Also, in the present embodiment, by amplifying the basic γδ-axis current command value (I γ0*, I δ0*) to compensate for the delay of the rotor flux response of the motor 3 to thereby calculate a flux compensation γδ-axis current command value (I γ1*, I δ1*) (first compensation) The magnetic flux compensation γδ-axis current command value (I γ1*, I δ1*) is further compensated for to calculate a γδ-axis current command value (I γ2*, I δ2*) (second compensation). The γδ-axis current command value (I γ2*, I δ2*) is restricted by the γδ-axis current limit value (I γlim, I δlim). When restricting by the γδ-axis current limit value (I γlim, I δlim), depending on the magnitude of the flux compensation γδ-axis current command value (I γ1*, the restriction is made. In the second compensation, after the magnetic flux compensation γδ-axis current command value (I γ1*, I δ1*) falls below the γδ-axis current limit value (I γlim, I δlim), a portion of the command value which has been subject to restriction by the γδ-axis current limit value (I γlim, I δlim) is added to the magnetic flux compensation γδ-axis current command value (I γ1*, I δ1*). Thus, when the magnetic flux compensation γδ-axis current command value (I γ1*, I δ1*) is partly restricted by the limit value, the portion of the flux compensation γδ-axis current command value (I γ1*, I δ1*) that cannot be output due to the current limit is added when the magnetic flux compensation γδ-axis current command value (I γ1*, I δ1*) becomes smaller than the limit value. Thus, the compensation may be additionally made to increase the torque response.

Note that, in the present embodiment, when calculating the slip angular velocity ωse, the slop angular velocity calculating unit 49 may use the previous value I γ_z, I δ_z of the current measurement value, instead of using the current command value I γ*, the I δ*.

Note that, in the present embodiment, when calculating the torque ideal response value (T m_ref), the ideal response torque calculating unit 104 may use the post-damping control torque command value (T m2*) as the command value, which has been calculated in the previous calculation timing. As described above, the rotor magnetic flux estimation unit 102 uses the γ-axis current command value (I γ_Z*) obtained in the previous calculation timing. Thus, in the ideal response torque calculating unit 104 as well, by using the post-damping control torque command value (Tm2*) for calculating the torque ideal response value (Tm_ref) for phase match.

Note that, the additional compensating value calculating unit 108 may be configured, when resetting the compensation value in response to the flag set by the integration reset determination unit 106 changing from "0" to "1" to cause the compensation value to be converged to zero with the passage of a predetermined time period from when the flag is changed from "0" and "1".

Note that the torque current estimation unit 110, in view of the delay due to control operation, may use the previous value of the basic δ-axis current command value instead of the basic δ-axis current command value (I δ0*). Alternatively, the torque current estimation unit 110 may use the actually detected value of the torque current detected by the sensor.

The basic current command value calculating unit 31 described above corresponds to the "current command value calculating means or device" of the present invention; the magnetic flux response compensation unit 32 corresponds to the "first compensation means or device" of the invention; the excitation current limiting unit 112 or the torque current limiting unit 212 correspond to the "first current command value limiting means or device" of the present invention; the excitation current command value deviation calculating unit 107, the torque current command value deviation calculation unit 207, and the additional compensation value calculating units 108 and 208 corresponds to the "second compensation means or device" of the present invention, the adders 109, 209 correspond to the "adding means or device"; and the excitation current limit value calculating unit 111 and the torque current limit value calculating unit 211 correspond to the "first current limit value calculating means or device" of the present invention, respectively.

Second Embodiment

Figure 12:
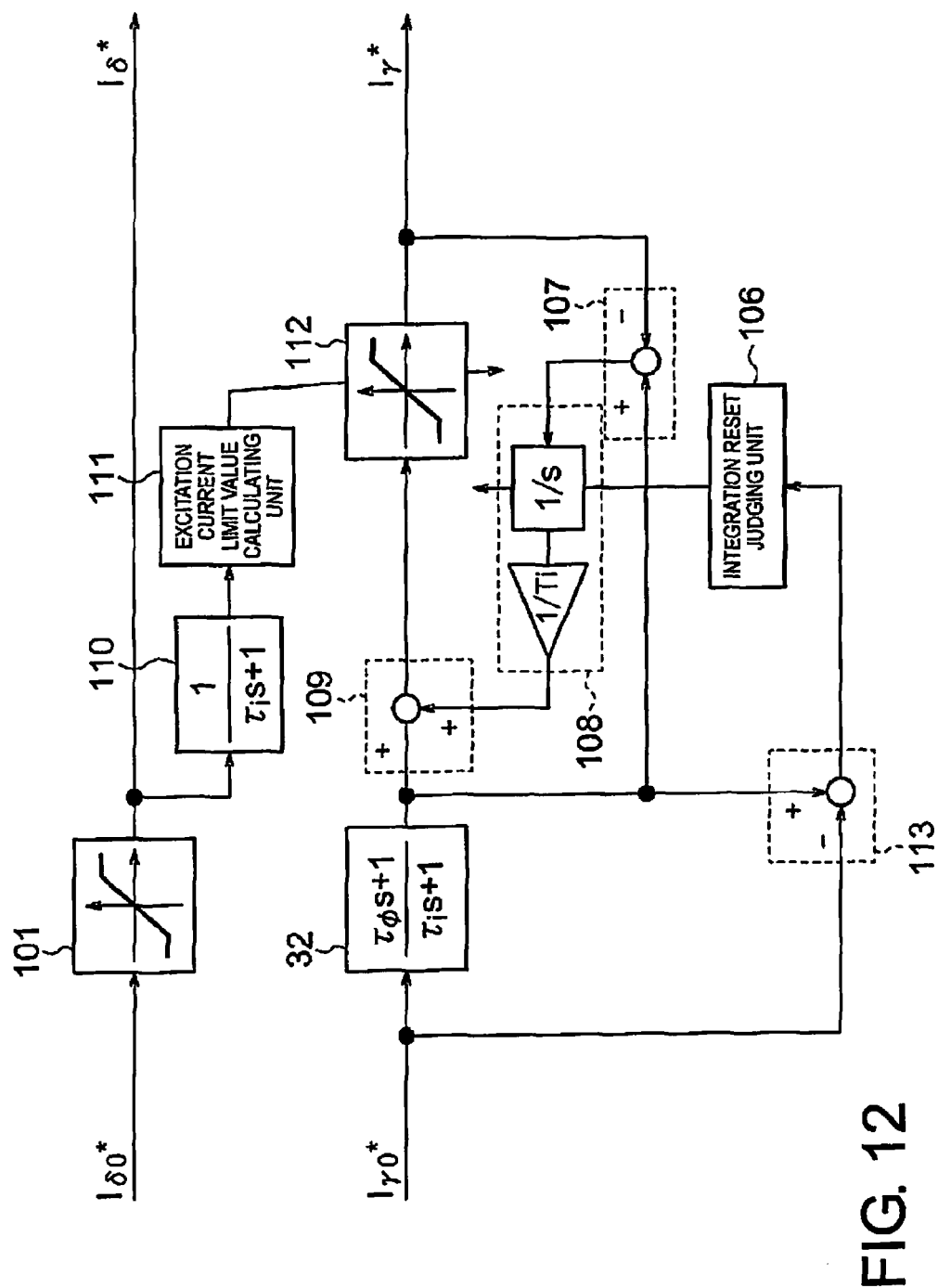
FIG. 12 is a block diagram of an excitation current compensation control unit of the motor control device in another embodiment according to the present invention.
Figure 13:
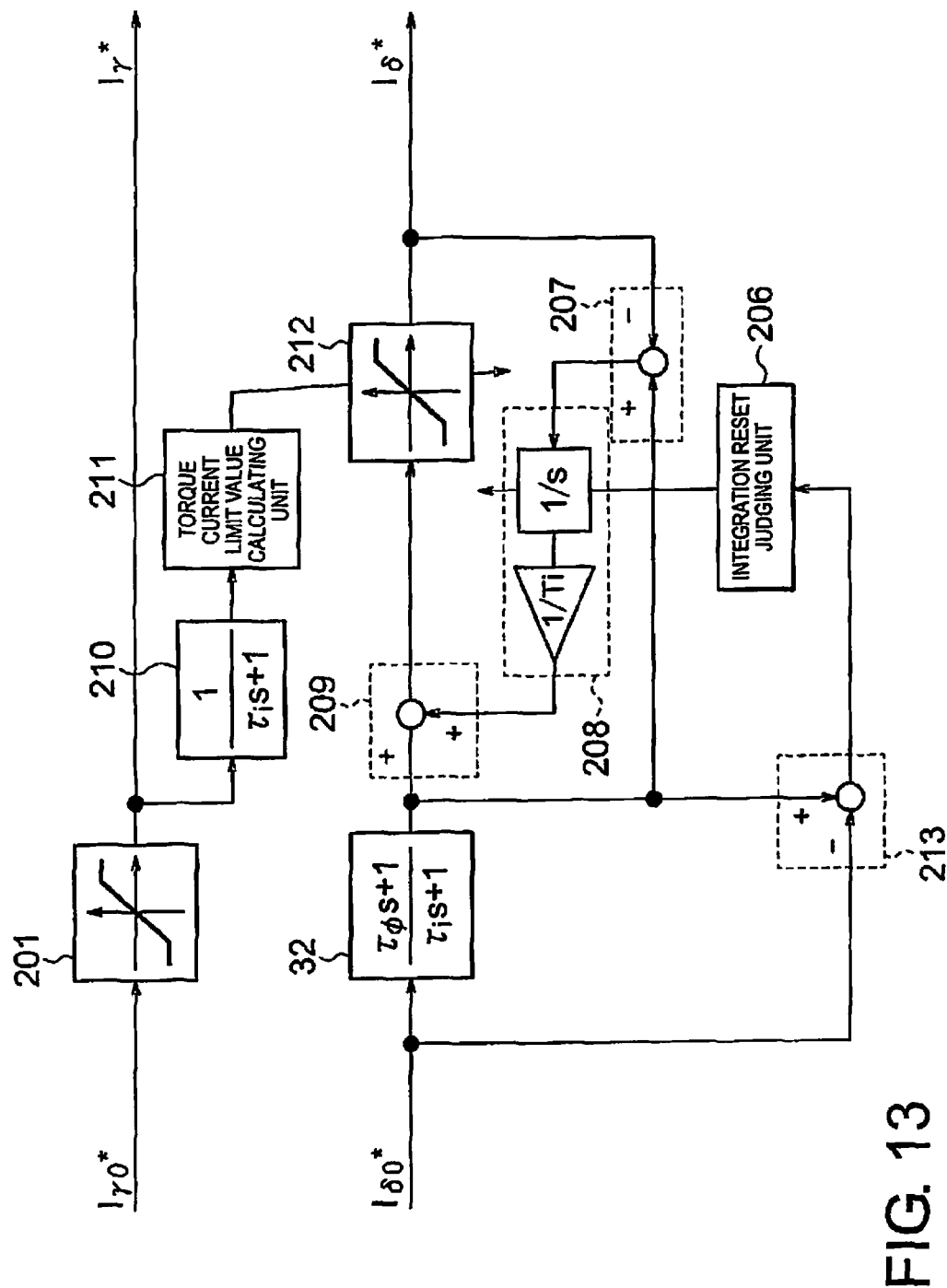
FIG. 13 is a block diagram of a torque current compensation control unit of the motor control device in an embodiment according to the present invention.

FIG. 12 shows a block diagram of the excitation current compensation control unit 100 of the motor control device pertaining to another embodiment according to the present invention. FIG. 13 is a block diagram of a torque current compensation control unit 200 of the motor control device. In the present embodiment, compared to the first embodiment described above, The first embodiment described above in this example, part of the configuration of the excitation current compensation control unit 100, and, part of the structure of the torque current compensation control unit 200 are different. Other than these configurations are the same as the first embodiment, the description thereof is appropriately incorporated.

As shown in FIG. 12, the excitation current compensation control unit 100 includes a torque current limiting unit 101, an integration reset determination unit 106, an excitation current command value deviation calculating unit 107, an additional compensation value calculating unit 108, an adder 109, a torque current estimation unit 110, an excitation current limit value calculating unit 111, an excitation current limiting unit 112, and an excitation current deviation calculating unit 113.

The excitation current deviation calculating unit 113, as shown in equation (23), by calculating the difference between the basic γ axis current command value (I γ0*) and a magnetic flux compensation γ-axis current command value (I γ1*), calculates the deviation of the excitation current command value (ΔI γ10*) for outputting to the integration reset judgment unit 106.

$$\Delta I^*_{\gamma 10} = I^*_{\gamma 1} I^*_{\gamma 0} \qquad (23)$$

The integration reset judging unit 106, in response to the excitation current command value deviation (ΔIγ10*), determines whether or not to reset the compensation value of the additional compensation value calculating unit 108, and outputs to the additional compensation value calculating unit 108 a flag (flg_IRST) indicating the determination result. Conditions of the judgment and the flag are shown as follows.

In case |ΔIγ10*|≥dIγ10*,flag_IRST=0 (Reset inhibited)

In case |ΔIγ10*|<dIγ10*,flag_IRST=1 (Reset done)

Note that the reset determination threshold (dIγ10* is a preset threshold value to suppress the overshoot of the output torque, and set from the design or experiments.

The additional compensation value calculating unit 108, based on the difference between the basic γ axis current command value (I γ0*) and the magnetic flux compensation γ-axis current command value (I γ1), resets the compensation value (I γ_FB). The difference between the basic γ axis current command value (I γ0*) and the magnetic flux compensation γ-axis current command value (I γ1) corresponds to the amount or portion of the command value that has been amplified by the rotor flux response compensation of the flux response compensation unit 32.

Therefore, in the period where the amount of the command value which was amplified in the magnetic flux response compensation unit 32 is equal to or greater than the reset determination threshold, the additional compensation value calculating unit 108 and the adder 109 perform the additional compensation of the excitation current. When the amount of the command value amplified by the magnetic flux response compensation unit 32 falls below the reset determination threshold, the compensation value is reset by the additional compensation value calculating unit 108. The additional compensation of the excitation current is thereby completed.

As shown in FIG. 13, the torque current compensation control unit 200 includes an excitation current limiting unit 201, an integration reset determination unit 206, a torque current command value deviation calculating unit 207, an additional compensation value calculating unit 208, an adder 209, an excitation current estimation unit 210, a torque current limit value calculating unit 211, a torque current limiting unit 212, and a torque current deviation calculating unit 213.

The torque current deviation calculating unit 213, as shown in equation (24), by calculating the difference between the basic δ-axis current value (I δ0*) and the magnetic flux compensation δ-axis current value (I δ1*), calculates a deviation of the torque current command value (ΔI δ10*) for outputting to the integration reset judgment unit 106.

$$\Delta I^*_{\delta 10} = I^*_{\delta 1} - I^*_{\delta 0} \quad (24)$$

The integration reset judging unit 206, in response to the deviation of the torque current command value (ΔI δ10*), determines whether or not to reset the compensation value of the additional compensation value calculating unit 208, and outputs to the additional compensation value calculating unit 208 a flag (flg_IRST) indicating the determination result. Conditions of the judgment and the flag are shown as follows.

In case |ΔIδ10*|≥dIδ10*,flag_IRST=0 (Reset inhibited)

In case |ΔIδ10*|<dIδ10*,flag_IRST=1 (Reset done)

Note that the reset determination threshold (dIδ10* is a preset threshold value to suppress the overshoot of the output torque, and set from the design or experiments.

As described above, in the present embodiment, based on difference between the basic γδ-axis current command value (I γ0*, I δ0*) and the flux compensation γδ-axis current command value (I γ1*, I δ1*), the compensation value (I γ_FB, I δ_FB) is configured to be reset. As a result, in a period where the increased amount of the current command value by the flux response compensation unit 32 is higher than a predetermined value (reset determination threshold (dI γ10*, dI δ10*)), a control is performed in which an additional compensation is applied, whereas in a period where the increased amount in the current command value is lower than the predetermined value, no additional compensation is done. Consequently, it is possible to suppress the overshoot of the output torque while increasing the torque response.

Third Embodiment

Figure 14:
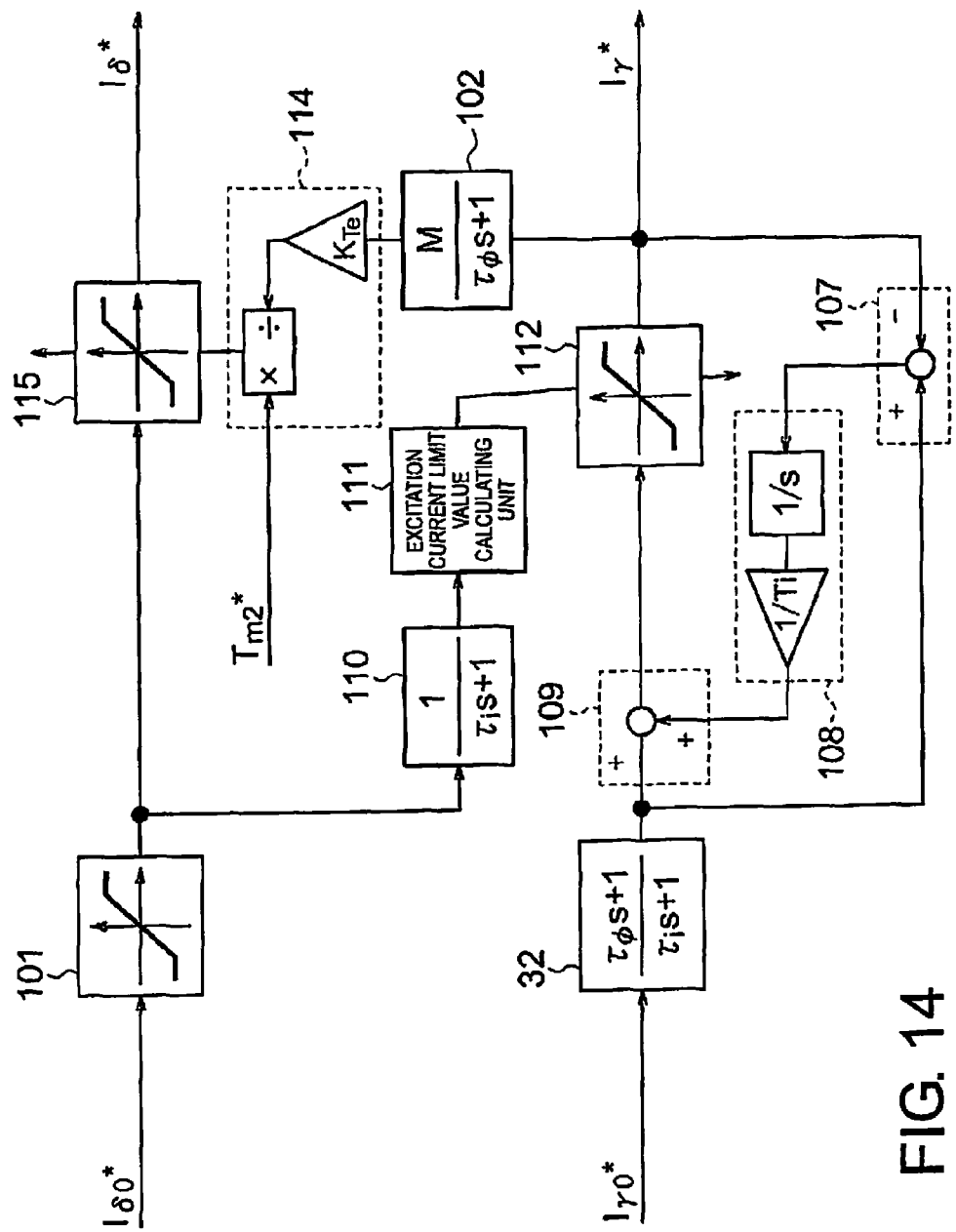
FIG. 14 is a block diagram of an excitation current compensation control unit of the motor control device in a yet another embodiment according to the present invention.
Figure 15:
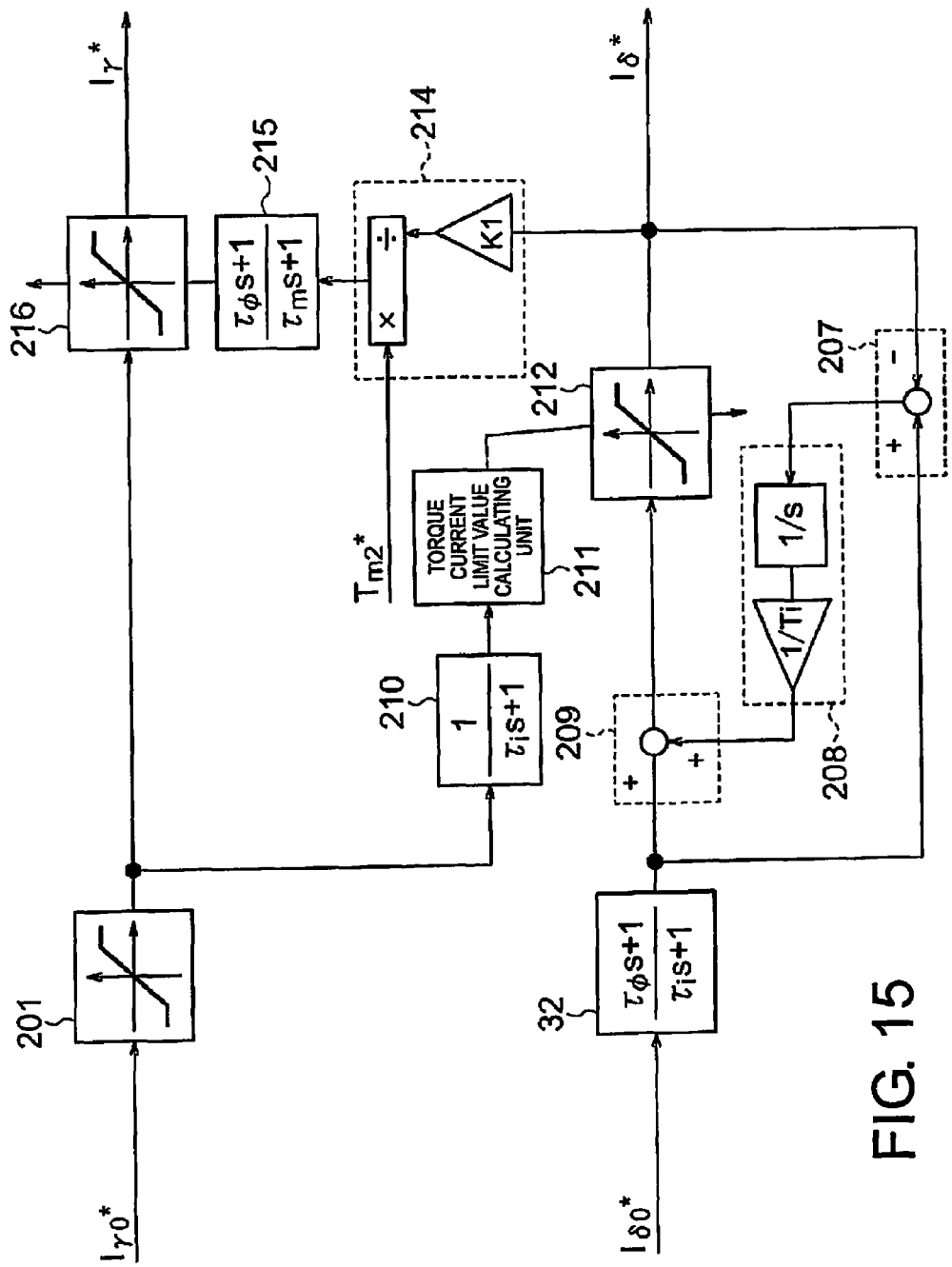
FIG. 15 is a block diagram of a torque current compensation control unit of the motor control device in the yet another embodiment according to the present invention.

FIG. 14 shows a block diagram of the excitation current compensation control unit 100 of the motor control device pertaining to yet another embodiment of the invention. FIG. 15 is a block diagram of a torque current compensation control unit 200 of the motor control device. In the present embodiment, compared to the first embodiment describe above, the configuration of the excitation current compensation control unit 100 and the configuration of the torque current compensation control unit 200 are partly different. The other configurations are the same as the first embodiment described above. The description of the first and second embodiments is therefore incorporated appropriately.

As shown in FIG. 14, the excitation current compensation control unit 100 includes a torque current limiting unit 101, a rotor flux estimation unit 102, an excitation current command value deviation calculating unit 107, and additional compensation value calculating unit 108, an adder 109, a torque current estimation unit 110, an excitation current limit value calculating unit 111, an excitation current limiting unit 112, a torque current limit value calculating unit 114, and a torque current limiting unit 115.

The torque current limit value calculating unit 114, as shown in equation (25), by dividing the post-damping control torque command value (T m2*) by a multiplied value of the torque constant (K Te) and the rotor flux estimate (φ est), calculates the δ-axis current limit value (I δlim) for outputting to the torque current limiting unit 115.

$$I_{\delta lim} = \frac{T^*_{m2}}{K_{Te} \cdot \phi_{est}} \quad (25)$$

The torque current limiting unit 115, by restricting the torque current command value calculated by the torque current limiting unit 101 by the positive and negative δ-axis current limit value (±I Slim), calculates the δ-axis current command value (I δ). The torque current compensation control unit 200 calculates a limit value for the γ-axis current value based on the δ-axis current value that is not compensated for by the flux response compensation unit 32, and applies an additional compensation to the γ-axis current command value, which is compensated for by the flux response compensation unit 32 for the command value to add restriction by the limit value of the γ-axis current.

Further, based on the γ axis current command value subject to restriction by the γ-axis current limit value, a limit value for the δ-axis current value will be calculated to add restriction on the δ-axis current value. Thus, through the compensation by the flux response compensation unit 32 and the compensation by the excitation current compensation control unit 100, whatever value the current command value might assume, it is possible for the output torque to approach the ideal response of the torque command value.

As shown in FIG. 15, the torque current compensation control unit 200 includes an excitation current limiting unit 201, a rotor flux estimation unit 202, an output torque estimation unit 203, an ideal response torque calculating unit 204, a torque deviation calculating unit 205, an integration reset determination unit 206, a torque current command value deviation calculating unit 207, an additional compensation value calculating unit 208, an adder 209, an excitation current estimation unit 210, a torque current limit value calculating unit 211, a torque current limiting unit 212, an excitation current limit value calculating unit 214, a limit value compensation unit 215, and an excitation current limiting unit 216.

The excitation current limit value calculating unit 214, as shown in equation (26), by dividing the post-damping control torque command value (T m2*) by a multiplication value of the motor torque constant (K 1) and the δ-axis current command value (I δ *), calculates a γ-axis current limit value (I γlim') for outputting to the limit value correcting unit 215.

$$I'_{\gamma lim} = \frac{T^*_{m2}}{K_1 \cdot I^*_\delta} \quad (26)$$

Wherein, the motor torque constant (K 1) is represented by M·K Te. Further, as described above, since the torque constant (K Te) is represented by p·M/Lr, the motor torque constant (K 1) is thus represented by K 1=p·M 2/Lr. The motor torque constant (K 1) is a previously set value by calculation or experiments.

The limit value correcting unit 215, as shown in equation (27), by multiplying the γ-axis current limit value (I γlim') with a function containing the time constant (τ m) and the time constant (t φ), corrects the γ axis current limit value (I γlim') to calculate a γ-axis current limit value (I γlim).

$$I_{\gamma lim} = \frac{\tau_\phi s + 1}{\tau_m s + 1} I'_{\gamma lim} \quad (27)$$

Note that the correction process by the limit value correcting unit 215 represents an approximate compensation process with respect to the rotor flux response and the torque response.

The exciting current limiting unit 216, by restricting on the excitation current command value calculated by the excitation current limiting unit 201 by the positive and negative γ-axis current limit value (±I γlim), calculates a γ axis current command value (I γ).

As described above, in the present embodiment, based on a command value that is compensated for by the flux response compensation unit 32, a limit value is calculated using the equation (25) or equation (26), and the current command value which is not compensated by the flux response compensation unit 32 is restricted by the limit value. Thus, through the compensation by the magnetic flux response compensation unit 32, and the compensation by the excitation current compensation control unit 100 or the torque current compensation control unit 200, whatever value the current command value might assume, the output torque may approach the ideal response of the torque command value.

The torque current limit value calculating unit 114 corresponds to the "second current limit value calculating means or device" of the present invention, while the torque current limiting unit 115 corresponds to the "second current command value limiting means or device" of the present invention, respectively.

The invention claimed is:

1. A motor control device, comprising:
   a current command value calculating device configured to calculate a basic current command value based on a torque command value input from the outside and a rotation speed of a motor;
   a first compensation device configured to compensate for delay of a rotor flux response of the motor by amplifying the basic current command value;
   a first current command value limiting device configured to restrict a post-compensation current command value by a first current limit value;
   a second compensation device configured to calculate, based on an amplified current command value calculated by the first compensation device and the first limited current command value calculated by the first current command value limiting device, a compensation value for the amplified current command value;
   an adding device configured to add the amplified current command value and the compensation value to calculate the post-compensation current command value; and
   a motor control device configured to control the motor based on the first restricted current command value, the second compensation device being configured to calculate, as the compensation value, a portion of the amplified current command value which has been subject to the restriction by the first current limit value.

2. The motor control device as claimed in claim 1, wherein
   the second compensation device is configured to integrate a difference between the amplified current command value and the first current limit value to calculate the compensation value.

3. The motor control device as claimed in claim 1, wherein
   the second compensation device is configured to multiply an integrated value obtained by integrating the difference between the amplified current command value and the first current limit value with a predetermined gain to calculate the compensation value.

4. The motor control device as claimed in claim 1, wherein
   the second compensation means device is configured to rest the compensation value based on a difference between an output torque of the motor and the torque command value.

5. The motor control device as claimed in claim 1, wherein
   the second compensation means device is configured to rest the compensation value based on a difference between the basic current command value and the amplified current command value.

6. The motor control device as claimed in claim 1, further comprising:
a second current limit value calculating device configured to calculate a second current limit value based on the first restricted current command value and the torque command value; and
a second current command value limiting device configured to restrict the current command value by the second current limit value, the first compensation device configured to calculate the amplified current command value by compensating for the basic current command value with respect to one of the current command values of the excitation current command value and the torque current command value included in the current command value of the motor, the second current limit value calculating device being configured to calculate a rotor flux estimation value of the motor based on the first restricted current command value to calculate the second current limit value by dividing the torque command value by a multiplication value of a gain determined by a motor constant and the rotor flux estimation value, the second current command value limiting device being configured to calculate the second restricted current command value by restricting by the second current limit value on the basic current command value of the excitation current command value or the torque current command value, which is not compensated by the first compensation device, and the motor control device being configured to control the motor based on the second restricted current command value.

7. The motor control device as claimed in claim 1, further comprising:
a first current limit value calculating device configured to calculate the first current limit value, the first compensation device being configured to compensate for the basic current command value of one of the excitation current command value and the torque current command value contained in the current command value of the motor to calculate the amplified current command value, and wherein the first current limit value calculating device being configured to estimate a current value of a current value which is not compensated by the first compensation device based on the basic current command value of the one of the excitation current command value and the torque current command value, which is not compensated by the first compensation device and to calculate the first current limit value based the estimated current value.

8. The motor control device as claimed in claim 1, further comprising:
a first current limit value calculating device configured to calculate the first current limit value, the first compensation configured to compensate for the basic current command value of one of the excitation current command value and the torque current command value contained in the current command value of the motor, and the first current limit value calculating device being configured to calculate the first current limit value based on the current command value of the one of the excitation current command value and the torque current command value, which is not compensated by the first compensation device and a maximum current limit value indicating the rated current of the motor, while satisfying the equation;

$$I_{lim} = \sqrt{(I_{max})^2 - (I^{a*})^2}$$

Wherein
$I_{lim}$ represents the first current limit value,
$I_{max}$ indicates the maximum current limit value,
$I_a$ represents a current command value which is not compensated by the first compensation device.

9. A motor control method, comprising:
calculating a basic current command value based on a torque command input from the outside and a rotation speed of a motor;
calculating an amplified current command value by amplifying the basic current command value for compensating for delay of a rotor flux response of the motor;
calculating a post-compensation amplified current command value by further compensating for the amplified current command value;
restricting the post-compensation amplified current command value by a current limit value corresponding to the magnitude of the amplified current command value;
controlling the motor by a command value restricted by the current limit value, when the amplified current command value is restricted by the current limit value, after the amplified current command value falls below the current limit value, the amount of the command value which has been subject to restriction by the current limit value is added to the amplified current command value.

10. The motor control device as claimed in claim 2, wherein the second compensation device is configured to multiply an integrated value obtained by integrating the difference between the amplified current command value and the first current limit value with a predetermined gain to calculate the compensation value.

11. The motor control device as claimed in claim 2, wherein
the second compensation device is configured to rest the compensation value based on a difference between an output torque of the motor and the torque command value.

12. The motor control device as claimed in claim 3, wherein
the second compensation device is configured to rest the compensation value based on a difference between an output torque of the motor and the torque command value.

13. The motor control device as claimed in claim 2, wherein
the second compensation device is configured to rest the compensation value based on a difference between the basic current command value and the amplified current command value.

14. The motor control device as claimed in claim 3, wherein
the second compensation device is configured to rest the compensation value based on a difference between the basic current command value and the amplified current command value.

15. The motor control device as claimed in claim 2, further comprising:
a second current limit value calculating device configured to calculate a second current limit value based on the first restricted current command value and the torque command value; and
a second current command value limiting device configured to restrict the current command value by the second current limit value, the first compensation device configured to calculate the amplified current command value by compensating for the basic current command value with respect to one of the current command values of the excitation current command value and the torque current command value included in the current command value of the motor, the second current limit value calculating device being configured to calculate a rotor flux estimation value of the motor based on the first restricted current command value to calculate the second current limit value by dividing the torque command value by a multiplication value of a gain determined by a motor constant and the rotor flux estimation value, the second current command value limiting device being configured to calculate the second restricted current command value by restricting by the second current limit value on the basic current command value of the excitation current command value or the torque current command value, which is not compensated by the first compensation device, and the motor control device being configured to control the motor based on the second restricted current command value.

16. The motor control device as claimed in claim 3, further comprising:
   a second current limit value calculating device configured to calculate a second current limit value based on the first restricted current command value and the torque command value; and
   a second current command value limiting device configured to restrict the current command value by the second current limit value, the first compensation device configured to calculate the amplified current command value by compensating for the basic current command value with respect to one of the current command values of the excitation current command value and the torque current command value included in the current command value of the motor, the second current limit value calculating device being configured to calculate a rotor flux estimation value of the motor based on the first restricted current command value to calculate the second current limit value by dividing the torque command value by a multiplication value of a gain determined by a motor constant and the rotor flux estimation value, the second current command value limiting device being configured to calculate the second restricted current command value by restricting by the second current limit value on the basic current command value of the excitation current command value or the torque current command value, which is not compensated by the first compensation device, and the motor control device being configured to control the motor based on the second restricted current command value.

17. The motor control device as claimed in claim 4, further comprising:
   a second current limit value calculating device configured to calculate a second current limit value based on the first restricted current command value and the torque command value; and
   a second current command value limiting device configured to restrict the current command value by the second current limit value, the first compensation device configured to calculate the amplified current command value by compensating for the basic current command value with respect to one of the current command values of the excitation current command value and the torque current command value included in the current command value of the motor, the second current limit value calculating device being configured to calculate a rotor flux estimation value of the motor based on the first restricted current command value to calculate the second current limit value by dividing the torque command value by a multiplication value of a gain determined by a motor constant and the rotor flux estimation value, the second current command value limiting device being configured to calculate the second restricted current command value by restricting by the second current limit value on the basic current command value of the excitation current command value or the torque current command value, which is not compensated by the first compensation device, and the motor control device being configured to control the motor based on the second restricted current command value.

18. The motor control device as claimed in claim 5, further comprising:
   a second current limit value calculating device configured to calculate a second current limit value based on the first restricted current command value and the torque command value; and
   a second current command value limiting device configured to restrict the current command value by the second current limit value, the first compensation device configured to calculate the amplified current command value by compensating for the basic current command value with respect to one of the current command values of the excitation current command value and the torque current command value included in the current command value of the motor, the second current limit value calculating device being configured to calculate a rotor flux estimation value of the motor based on the first restricted current command value to calculate the second current limit value by dividing the torque command value by a multiplication value of a gain determined by a motor constant and the rotor flux estimation value, the second current command value limiting device being configured to calculate the second restricted current command value by restricting by the second current limit value on the basic current command value of the excitation current command value or the torque current command value, which is not compensated by the first compensation device, and the motor control device being configured to control the motor based on the second restricted current command value.

19. The motor control device as claimed in claim 6, further comprising:
   a first current limit value calculating device configured to calculate the first current limit value, the first compensation device being configured to compensate for the basic current command value of one of the excitation current command value and the torque current command value contained in the current command value of the motor to calculate the amplified current command value, and the first current limit value calculating device being configured to estimate a current value of a current value which is not compensated by the first compensation device based on the basic current command value of the one of the excitation current command value and the torque current command value, which is not compensated by the first compensation device and to calculate the first current limit value based the estimated current value.

20. The motor control device as claimed in claim 6, further comprising:

a first current limit value calculating device configured to calculate the first current limit value, the first compensation configured to compensate for the basic current command value of one of the excitation current command value and the torque current command value contained in the current command value of the motor, and the first current limit value calculating device being configured to calculate the first current limit value based on the current command value of the one of the excitation current command value and the torque current command value, which is not compensated by the first compensation device and a maximum current limit value indicating the rated current of the motor, while satisfying the equation;

$$I_{lim} = \sqrt{(I_{max})^2 - (I_a^*)^2}$$

Wherein
$I_{lim}$ represents the first current limit value,
$I_{max}$ indicates the maximum current limit value,
$I_a^*$ represents a current command value which is not compensated by the first compensation device.

* * * * *